US012654611B2

(12) United States Patent
Keller et al.

(10) Patent No.: US 12,654,611 B2
(45) Date of Patent: Jun. 16, 2026

(54) MOBILE HOME SYSTEM

(71) Applicant: Atomic Design, Inc., Lititz, PA (US)

(72) Inventors: Zachary Andrew Keller, Lititz, PA (US); Adam John Curry, Lititz, PA (US)

(73) Assignee: Atomic Design Inc., Lititz, PA (US)

( * ) Notice: Subject to any disclaimer, the term of this patent is extended or adjusted under 35 U.S.C. 154(b) by 0 days.

(21) Appl. No.: 18/597,280

(22) Filed: Mar. 6, 2024

(65) Prior Publication Data

US 2024/0246474 A1     Jul. 25, 2024

Related U.S. Application Data

(63) Continuation of application No. 17/534,227, filed on Nov. 23, 2021, now Pat. No. 11,932,160.

(51) Int. Cl.
*B60P 3/32* (2006.01)
(52) U.S. Cl.
CPC ..................................... *B60P 3/32* (2013.01)
(58) Field of Classification Search
CPC ...... B60P 3/32; B60P 3/34; B60P 3/36; B62D 25/02; B62D 27/023; B62D 29/02; B62D 63/06
USPC ................................. 296/156, 168
See application file for complete search history.

(56) References Cited

U.S. PATENT DOCUMENTS

| | | | | |
|---|---|---|---|---|
| 1,614,401 | A | 1/1927 | Shakespeare | |
| 1,671,457 | A | 5/1928 | Wiedman | |
| RE17,441 | E | 9/1929 | Tasman | |
| 2,855,240 | A * | 10/1958 | Toland ...................... | B60P 3/32 296/172 |
| 4,930,809 | A * | 6/1990 | Lindsay ................... | B60P 3/32 280/789 |
| 6,231,115 | B1 * | 5/2001 | Crean .................... | B62D 53/06 280/789 |
| 11,235,637 | B1 * | 2/2022 | Goldenberg ....... | B60H 1/00564 |
| 11,541,936 | B1 | 1/2023 | Lutz | |
| 11,814,109 | B2 * | 11/2023 | Gabet ...................... | B32B 3/14 |

FOREIGN PATENT DOCUMENTS

FR          2504236          10/1982

* cited by examiner

*Primary Examiner* — Jason S Daniels
(74) *Attorney, Agent, or Firm* — Barley Snyder

(57) ABSTRACT

A mobile home system is provided and generally includes a structure and a trailer. The structure includes a floor portion, a roof portion, and a plurality of vertical walls positioned between the floor portion and the roof portion. The trailer is coupled to the floor portion of the mobile home and includes a chassis and a tongue, the chassis includes a pair of outer frame rails and a pair of inner frame rails extend longitudinally along a length of the trailer. The inner frame rails and the pair of outer frame rails form structural box members at the outermost sides of the trailer.

6 Claims, 14 Drawing Sheets

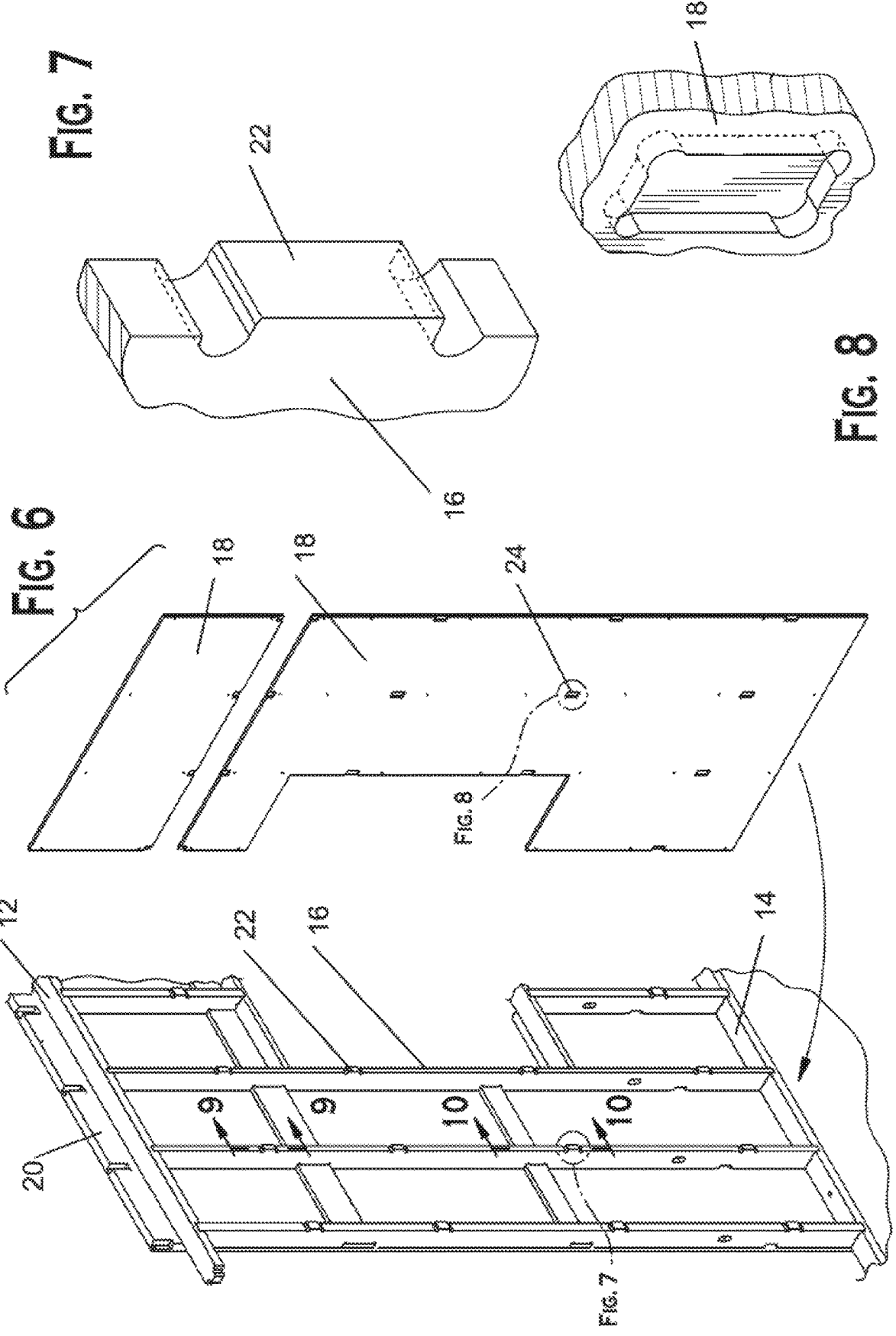

30

46

32

30

12

16

46

MOBILE HOME SYSTEM

CROSS-REFERENCE TO RELATED APPLICATION

This application is a continuation of U.S. patent application Ser. No. 17/534,227, filed on Nov. 23, 2021.

FIELD OF THE INVENTION

The invention relates to the construction of mobile homes, typically having less than one thousand square feet and usually referred to as tiny homes, and more particularly, to towable or mobile prefabricated homes that are built upon, or mounted onto a towable trailer or mobile platform, such that they can be located temporarily or semi-permanently in one location, but are capable of being relocated through the use of a tow vehicle that can be used to relocate the mobile home on the trailer.

BACKGROUND

In recent years, there has been a growing popularity and interest in smaller homes; becoming more prevalent in popular culture, and the interest spawning several television shows on the subject. The increased interest has been driven by a variety of factors.

Cost of ownership—The smaller houses can provide shelter and a comfortable home, while offering the benefits of often being of lower cost than a larger house, for example to build, operate and maintain. Smaller houses have a small footprint should be subjected to lower tax assessments, such as property tax, or utilities costs, as well as provide lower initial building costs. Furthermore, the smaller size would result in lower heating and cooling costs. With a smaller house, the costs of maintaining and repairing the tiny house would be proportionally less than those costs for a larger house. Lesser footprint of house can be accommodated on a smaller lot size, leading to a reduced cost for entry into the market. Additionally, a tiny home on a trailer avoids the complexity of local permitting, zoning and building codes that would be applicable if the house were to be built upon a traditional foundation.

Environmental interest and conservation—Smaller homes provide a reduced ecological impact, and less footprint or foundation for the house. As the reduced footprint of a tiny home requires a proportionally smaller area that must be prepared or graded for placement of the home on that land, the impact to the environment from the placement of a smaller home would be proportionally less than the impact of a larger home. Furthermore, where the home is a mobile home mounted on a trailer, the preparation of the situating the home may be simply providing an area upon which the trailer can be parked that is nearly flat.

Ease of relocating—the mobile home allows the owner to travel with their home, as it can be towed by a tow vehicle to a different location, enabling the comfort and familiarity of home, while the ease of portability allows placement in new locations. In this manner, the owner is able to situate the home in different locations, as may allow the user travel to new areas, or as may be desirable for work, family, or recreational purposes. Furthermore, in areas that are subject to periodic weather or natural disaster events, such a mobile home could be removed from an area to avoid events that provide some notice before arrival, such as forest fires or hurricanes, where the user can opt to relocate the home to a safe location, and optionally may return after the danger or impact has subsided.

Traditional construction techniques have been utilized in the past for the construction of tiny homes that are largely similar to those techniques utilized in larger homes. For example, traditional stud framing may be employed, having sheathing applied to the exterior of the stud frame in order to enhance the structural stability of the stud framework, as the sheathing provides reinforcement in a plane that can be adhered to the stud framework, and can serve to prevent lateral movement or deflection of the framework components along the plane of the sheathing.

Such sheathing is applied to the exterior of the framework, and an exterior wall treatment, such as siding is then applied over the sheathing, typically by being nailed directly to the sheathing through a barrier of sheathing paper, or housewrap, that can permit passage of moisture vapor out from the wall, but prevent infiltration of wind and/or water. Such sheathing serves as an exterior structural reinforcement applied to the wall studs, and are more likely to be subjected to, or exposed to elements. For example, improperly applied siding may result in water penetration through the moisture barrier, which may lead to structural integrity issues if the sheathing layer is affected by the moisture penetration, potentially leading to warping or rotting of the sheathing, reducing the effectiveness in reinforcing the stud framing and consequently negatively affecting the sturdiness and integrity of the structure.

Additionally, an ongoing concern with tiny homes, especially mobile tiny homes, is providing adequate thermal management to maintain user comfort, and protect the interior from damage that could occur in extreme temperatures. For example, poorly insulated exterior facing panels, such as roofs, walls, floors, especially where the floor is in direct contact with a metal trailer of a mobile home, can lead to extensive heat loss in the winter, or heat soak in the summer. In the case of severe or sustained low temperatures, the damage may manifest in the form of burst pipes due to freezing within the pipes, or condensation within the wall cavity from poor temperature and moisture management, which can lead to rot of wood components. In many instances, merely providing insulation between joists, or between studs within wall or panel cavities is unable to provide adequate protection from variable outside temperatures, as the studs or joists can serve as a thermal bridge. There is a need for a mobile home that utilizes design and construction features to minimize thermal bridging between the flooring and the underlying trailer frame, as well as building techniques that provide improved insulative properties to externally facing walls, and adequate moisture management properties.

Using modular home construction techniques, faster completion of mobile housing units can be achieved, relative to traditional homes built on site using traditional methods. Thus mobile housing units can be provided, and are advantageously less expensive, and can be produced, transported, and quickly and accurately placed on site, relative to traditional construction techniques for residences, thereby providing affordable housing that may otherwise be out of financial reach for many.

There is a need for a cost effective, mobile homes that can be assembled using modular construction techniques to form a reliable shelter that can withstand the elements, and allows for easy relocation by virtue of being mounted on a towable trailer.

SUMMARY

What is needed is towable trailer supporting a mobile home mounted thereon, that can be prepared using a modular construction technique that utilizes structural reinforcement mechanically secured to the interior of the wall framing, and in a position that reduces the likelihood of being affected by the elements. Therefore, there is provided a trailer mounted modular mobile home and in an exemplary embodiment, there is provided a mobile home system, with a structure and a trailer. The structure includes a floor portion, a roof portion, and a plurality of vertical walls positioned between the floor portion and the roof portion. The trailer is coupled to the floor portion of the mobile home and includes a chassis and a tongue, the chassis includes a pair of outer frame rails and a pair of inner frame rails extend longitudinally along a length of the trailer. The inner frame rails and the pair of outer frame rails form structural box members at the outermost sides of the trailer.

In an embodiment, the mobile home system may further have a vapor barrier membrane provided between the trailer platform and the structure, the vapor barrier membrane having planar dimension in length and width that exceeds a length and width of the structure.

In an embodiment, the mobile home system may have the laminate construction of the floor portion be an adhesive securing a top sheathing layer to a first side of a foam insulation layer, and further securing a bottom sheathing layer to a second side of the foam insulation layer, the laminate construction providing the floor portion as a mono-lithic, uniform floor.

In an embodiment, the mobile home system may provide a plurality of ribs 88 provided around the perimeter of the foam insulation layer, the ribs having the same thickness as the foam insulation layer. Some of the ribs can be provided within the foam insulation layer at locations where the flooring portion will be subjected to continuous weight application.

In an embodiment, there is provide the mobile home system where the foam insulation layer is an insulation foam board having a thickness of approximately 2 inches, the top sheathing layer is a wood panel having a thickness of approximately 0.75 inches, the bottom sheathing layer is a wood panel having a thickness of approximately 0.375 inches. The insulation foam board may comprise one of polystyrene, and polyisocyanurate. The top sheathing layer and the bottom sheathing layer may each independently be one of plywood, oriented strand board, structural fiber board, solid wood sheathing, particle board, medium density fiberboard, and high density fiberboard, and combinations thereof.

In an embodiment, the mobile home system has the chassis of the trailer with a pair of inner frame rails extending the length and on opposing sides of the chassis, the pair of inner frame rails being positioned with an inner frame rail upper surface at a first height. The chassis of the trailer may also have a pair of outer frame rails on opposing sides of the trailer and extending along at least a portion of the length of the chassis, the pair of outer frame rails being positioned with an outer frame rail upper surface at the first height. The chassis of the trailer may also have a plurality of cross rails extending between and perpendicular to the pair of inside frame rails, the plurality of cross rails being positioned with a cross rail upper surface at a second height, wherein the second height is lower than the first height. In an embodiment, the second height is approximately 2 inches below the first height. The trailer may further have a layer of insulation board positioned between the pair of inner frame rails, and atop the plurality of cross rails, where an upper surface of the insulation board is positioned at the first height, and the inner frame rails, outer frame rails, and layer of insulation board form the trailer platform.

In an embodiment, the mobile home system may have the trailer provided with a shield layer positioned between the insulation board and the plurality of cross rails.

In an embodiment, the mobile home system has the wall portion having a plurality of exterior sheathing panels applied to the exterior edge face of the plurality of studs. The plurality of exterior sheathing panels and the plurality of interior sheathing panels may be secured with a securement means to the plurality of studs. The securement means can be one or more of adhesives, screws, nails.

In an embodiment of the mobile home system, the roof portion has at least one roof panel, and may.

In an embodiment of the mobile home system, the at least one pair of bottom plates of the roof portion are each aligned with the top plate of the at least one wall, and secured by mechanical connection. The mechanical connection may be at least one tie configured to be secured at a first tie end to one of the plurality of studs of the wall portion, the at least one tie extending around the top plate and bottom plate, and the tie is secured at a second tie end to one of the plurality of rafters.

In an embodiment of the mobile home system, the vapor barrier membrane is a polymer sheet; and in an embodiment may be polyoxymethylene.

BRIEF DESCRIPTION OF THE DRAWINGS

The invention will be explained in greater detail in the following with reference to embodiments, referring to the appended drawings, in which:

FIG. 6 is a detailed exploded view of the inside panel sheathing and the framing of the sidewall of the mobile home according to the invention;

FIG. 7 is an enlarged detail view of the tenon of the framing portion of the sidewall according to the invention;

FIG. 8 is an enlarged detail view of the mortise of the inside panel sheathing of the sidewall according to the invention;

DETAILED DESCRIPTION OF THE EMBODIMENT(S)

Embodiments of the invention will now be described in greater detail with reference to the drawings.

Figure 1:
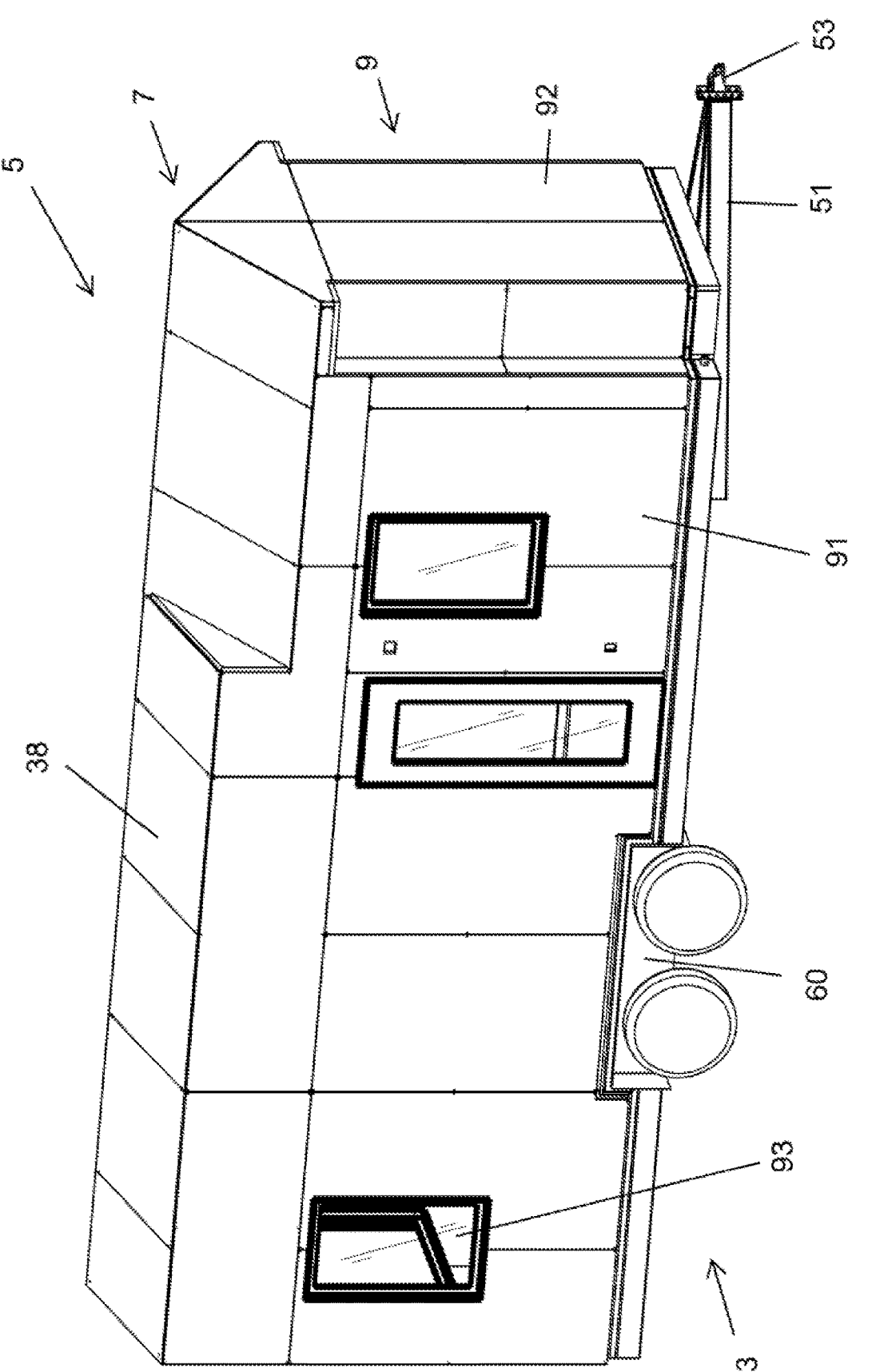
FIG. 1 is a three quarter side perspective view of a mobile home incorporating a home mounted on a towable trailer, according to an embodiment of the invention.

Referring first to FIG. 1, there is depicted an exemplary model of a mobile home 5, having a floor portion 8 (depicted in FIG. 4A), a roof portion 7, and at least one vertically oriented wall portion 9 extended between the floor portion and roof portion. In an embodiment, the mobile home 5 may have at least four vertical walls in the form of a pair of sidewalls 91, a front wall 92, and a back wall 93, forming an enclosure about the interior of the structure. The terms "front", "sides", and "back" are referring to the orientation as determined by the usual direction of travel of the trailer 3. It is contemplated that any of the walls 91, 92, 93 of the wall portion 9 could provide a door opening that will be utilized by the occupant as the main entrance and exit, and be understood to be the front, according to the occupant's usage. It is contemplated that the depicted embodiment is representative, and additional configurations for the shelter layout are possible, and may require additional walls, or alternative roof and floor components as would be known to those skilled in the art. Though not depicted, it is anticipated that walls may be provided within the interior of the mobile home. Such entirely interior contained walls may utilize the same framing techniques, but provide on all exposed surfaces the interior sheathing panels 18, as will be described. In an embodiment, all of the walls of the wall portion 9, whether interior or exterior, load bearing, or not, may utilize the framing techniques, along with the application of interior sheathing panels as taught herein to provide adequate strength and self-alignment to the framing, and such walls can be assembled more accurately, efficiently, and ensure that the wall is provided as square and true, such that the structure of the mobile home can be built to the plan design. As can be seen in FIG. 1, at least one of the vertical walls, here depicted as sidewall 91, may be provided with a doorway opening, and optionally at least one window opening. FIG. 1 depicts the modular home unit secured onto a trailer 3, having one or more axles 57 that are supporting a trailer chassis 50 through a suspension system, and having a tongue 51 at the front of the trailer that can be mechanically affixed to a tow vehicle in a releasable manner, using a tongue coupler 53 for releasably mounting to a tow hitch of a vehicle. The mobile home 5 when fully assembled may optionally have a window in each window opening, and a door installed in the door opening. In some embodiments, the mobile home 5 may further have exterior applications to provide additional weather protection and aesthetics, including optionally, roofing products suitable for placement on a mobile home, for example roof panels, such as metal panels on the roof. The mobile home 5 may further be provided with a weather resistive barrier, such as housewrap, insulating foam board panels, and may optionally have a finishing layer, such as siding, clapboard, or other finishing layer suitable for placement on the vertical wall surfaces of the mobile home to provide a weather-proof exterior.

Figure 2:
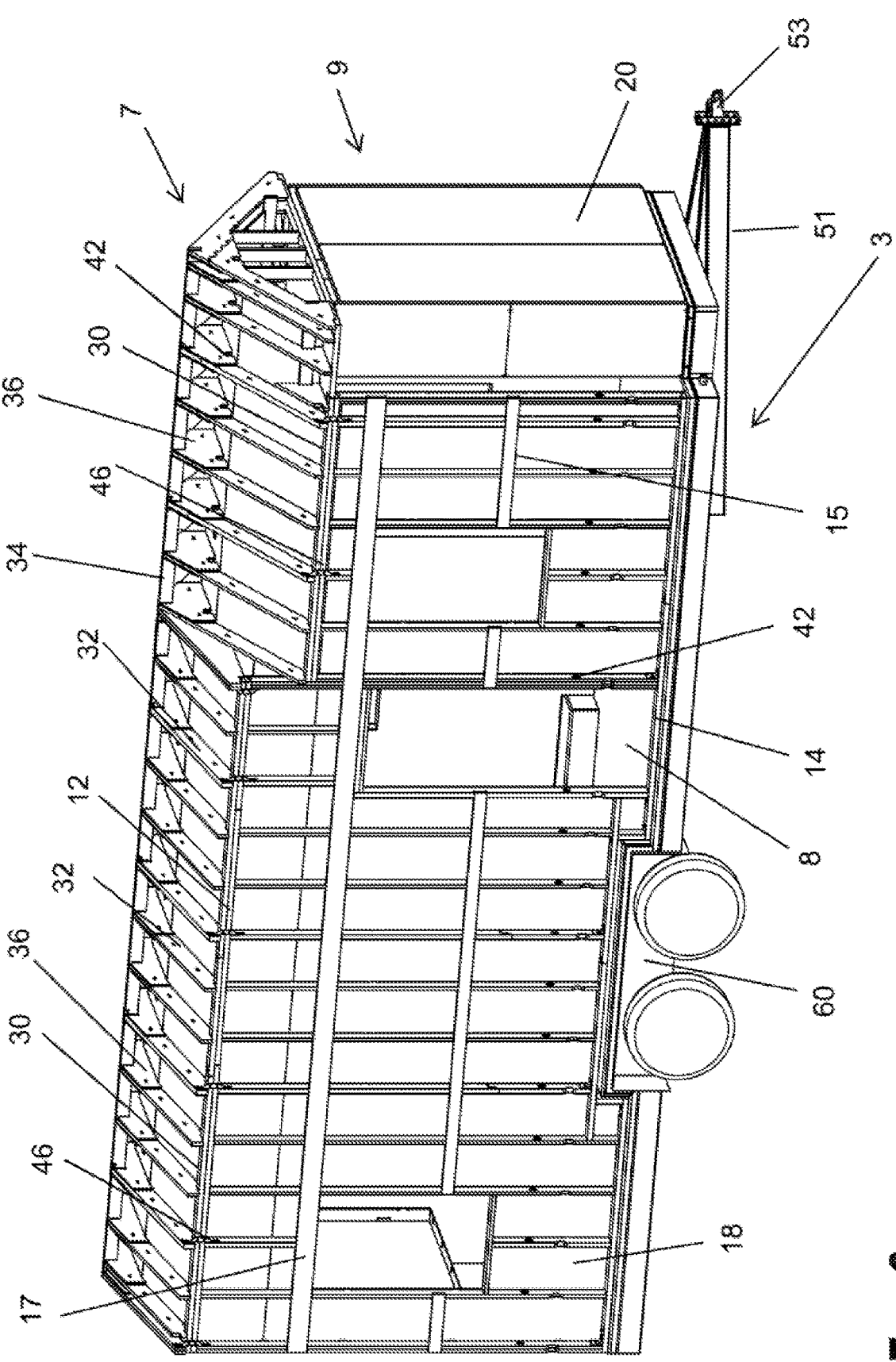
FIG. 2 depicts the same view of the mobile home of FIG. 1, only with the exterior panels and roof panels removed to show internal details.

FIG. 2 depicts the mobile home and trailer of FIG. 1, only with the exterior removed to expose the internal aspects of the side wall 91. In an exemplary embodiment of the mobile home 5, each wall 91, 92, 93 of the wall portion 9 has a plurality of vertical studs 16 extending between a sill plate 14 at the bottom of the wall and a top plate 12 at the top of the wall. As shown, one or more of the walls may be provided with one or more of a door opening and/or a window opening. The framing of the wall would be modified as known to those of skill in the art, to accommodate such openings, for example by providing a cripple stud, window sill, or header.

In an embodiment, the mobile home 5 wall portion provides a continuous header bar 17 extending along the length of one or more of the respective walls 91,92,93. The continuous header bar 17, as shown, can serve as the header for the door opening, as well as the header for the window opening(s) within the respective wall. Details of the sidewall 91 can be seen with reference to the cross-section view of FIGS. 4A and 4B. As depicted, the header bar 17 is inset into a recess provided in the vertical studs 16, such that the header bar does not protrude out from the rest of the stud the header bar rests against. The header bar 17 may further be secured by a fastener to each of the studs 16 it rests against, and can further serve to lock the wall studs 16 in true and square position, further providing an accurate wall build. In an embodiment, the wall portion 9 may further provide a belt rail 15 extending along portions of the wall, but at a height that would be interrupted by the door and window opening, if present. The belt rail 15, if present, would be fit into a recessed opening provided in the appropriate studs through which the belt rail would pass, in a manner similar to the placement of the header bar 17. Such a belt rail 15, as well as the continuous header bar 17, may provide a useful reference point for height, and may also function as nailer useful for securing other components thereto.

Figure 4A:
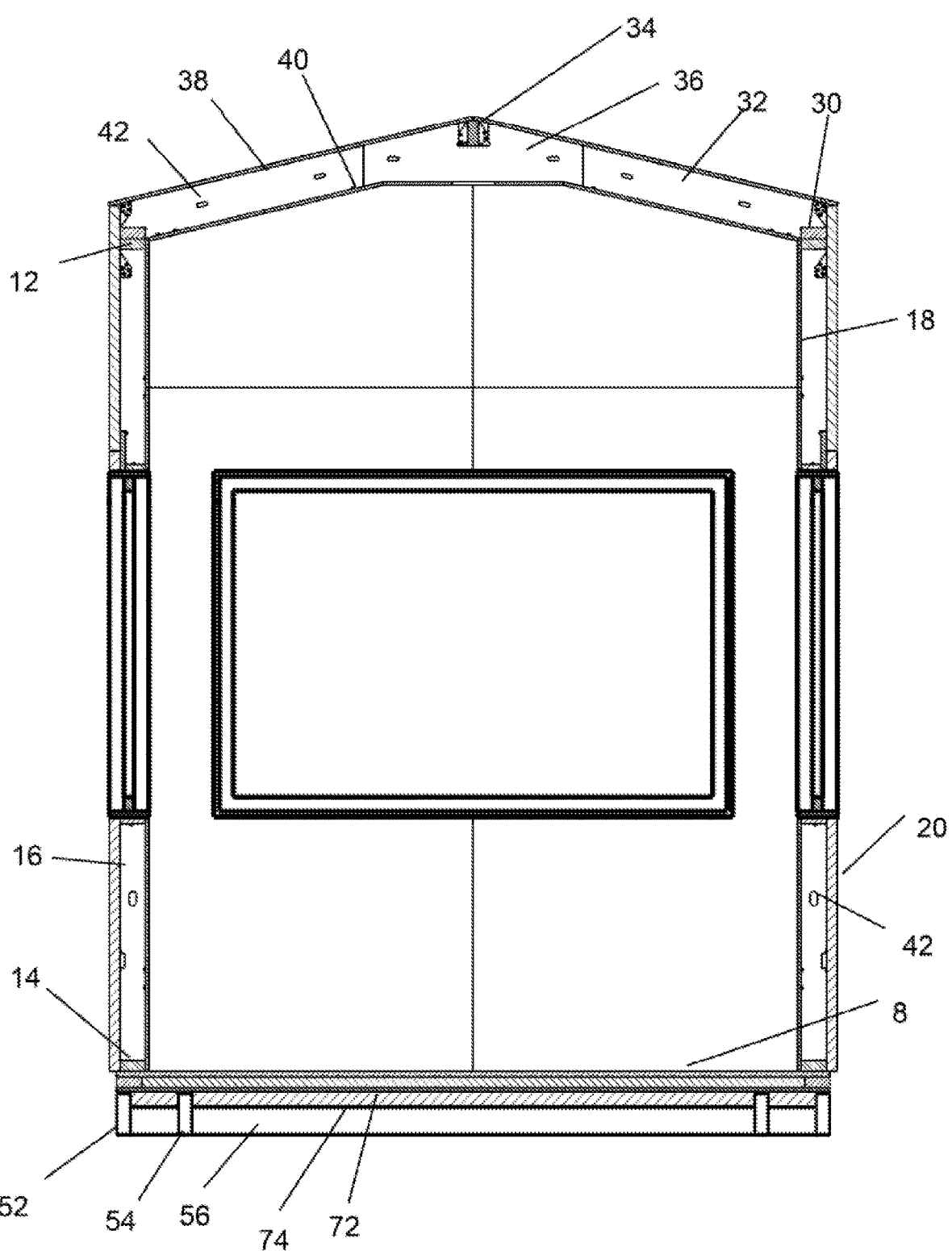
FIG. 4A is a rear cross-section view through the mobile home of FIG. 1 at a location between the back wall and behind the rear axle, in a plane traversing through the window of the sidewall.
Figure 4B:
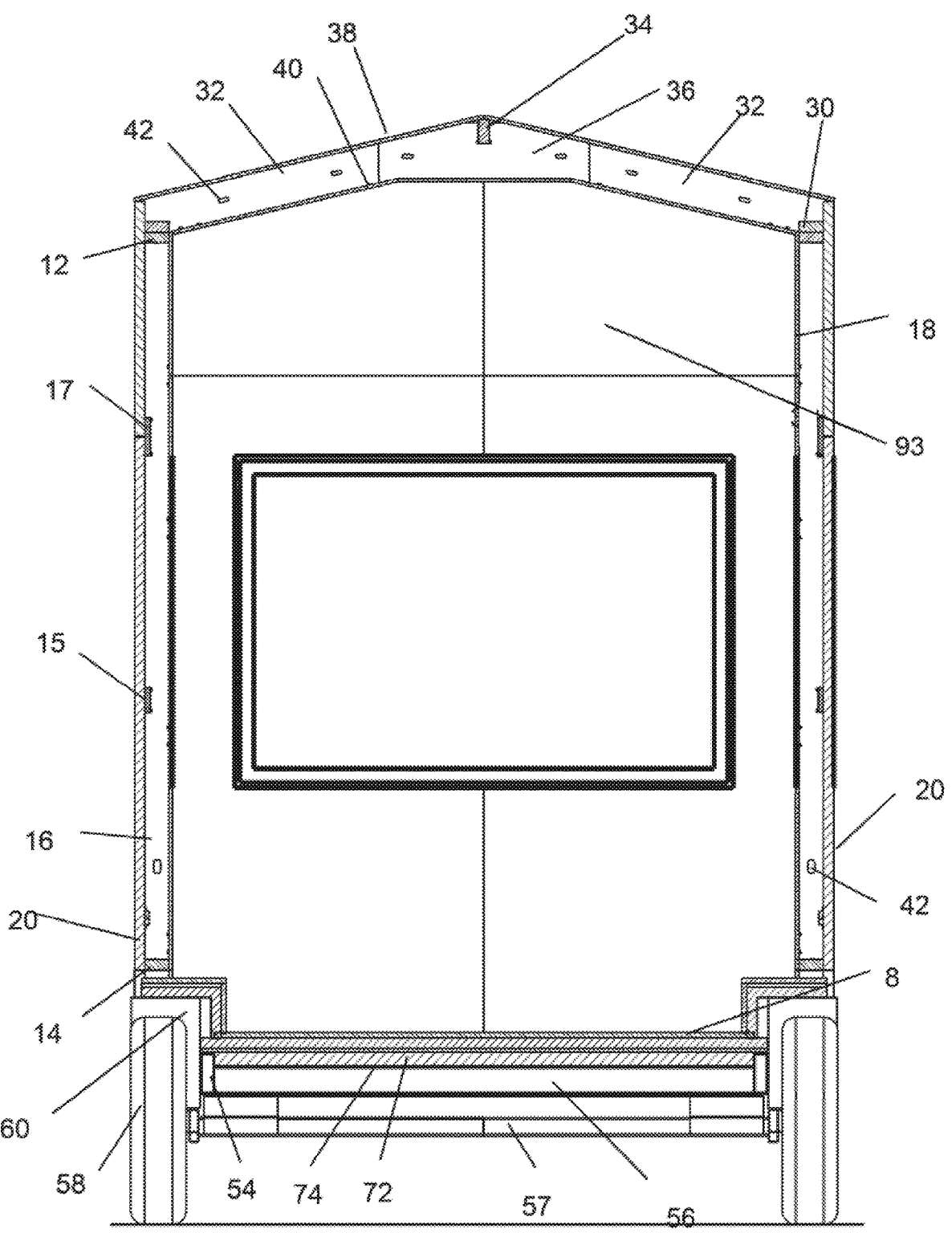
FIG. 4B is a rear cross-section view through the mobile home of FIG. 1 at the location of the wheel well, and adjacent to a wheel axle.

As can be seen with reference to FIGS. 2 and 4A, 4B, at least one or more of the vertical walls 91, 92, 93 of the wall portion 9, are provided with one or more openings or recesses 42 within some, or all of the vertical studs 16, in order to allow utilities or other lines, such as water, gas (e.g., natural gas and liquid or low pressure propane), electric, data, or heating and air conditioning lines, as non-limiting examples, to be run through some of the wall portion 9. Similarly, it is contemplated that such openings 42 may similarly be provided in the rafters of the roof portion. The utilities, if necessary, may also be routed below the mobile home 5, though that routing can be accessed from below the trailer. Preferably, each of a set of openings 42 in the plurality of studs 16 would be provided at a consistent height, for ease in running the utility lines through a set of openings. It is further contemplated that a first set of lines may be run through one set of openings at one height, and another set of utility lines may be run through another set of openings at a different height. Alternatively, multiple utilities maybe run through the same set of openings in the vertical studs. Such utility lines may be installed through the openings 42 at any suitable point during the construction of the mobile home 5. For ease of access to the openings 42, it is contemplated that the utility lines may preferably be run through the framing of the wall portion 9 prior to placing the external barrier membrane and exterior panels, or siding, as appropriate, in place on the exterior of the mobile home 5. In some instances, the utility lines, such as water lines, may be sensitive to exposure to extreme, or sustained high or low temperatures. For example, water lines may be subject to freezing and as a result may burst, and care must be taken to provide adequate protection from temperature exposure. The thermal management techniques to provide a beneficial level of protection for these utility lines, as well as the structure of the mobile home 5, and provide for occupant comfort will be discussed below.

Internal construction elements of an exemplary wall portion 9 can be seen with reference to FIGS. 2, 4A, 4B, and 5, where there is provided a sill plate 14, a top plate 12, and a plurality of vertical studs 16 extending between the sill and top plates. For any of the embodiments contemplated herein, it is recognized that the framing components utilized may be any suitable framing material known to those skilled in the art, including, but not limited to dimensional lumber, laminated strand lumber, metal framing components, plastic lumber, engineered lumber, oriented strand lumber, oriented structural straw board, as non-limiting examples. It is recognized that wood and pulp based framing components may tend to warp, have defects, such as knots, or be affected by moisture content and manufacturing technique, as is often seen with dimensional lumber. The wall panels contemplated herein will desirably be dimensionally accurate, and in order to ensure dimensional accuracy of the components and the resultant framing with the assembled components, the framing components may be machined to precise dimensions. For example, the top and sill plates 12,14 may be provided with grooves milled into the surfaces, in order to ensure that the joining surfaces are dimensioned properly, and the grooved faces are at the proper depth within the lumber. This can be seen with reference to FIG. 6, where the material provided as the top and sill plates 12, 14 may be machined, milled, or formed such that there are provided grooves for receiving the vertical framing pieces of the studs 16 therein, and the formed grooves are certain to have the correct dimensions for ensuring the resulting wall dimensions are accurate. Additionally, the studs 16 may be machined or milled to proper width and length, such that the ends of the studs 16 fit into the grooves, if any, provided in the top and sill plates 12, 14. In this manner, any swelling, warping, or shrinkage, or dimensional variations of the framing materials may be removed by milling the portions to be secured together to precise dimensions. The wall panel may optionally further have a skin or sheathing layer affixed on one or both of the first and second major faces of the wall, as will be discussed. At least the outside surface of the exterior sheathing 20 may have a membrane layer, which may be a barrier membrane, as will be discussed. Additional representative cross-sectional views of portions of the wall panel can be seen with reference to FIGS. 4A and 4B. FIG. 4A depicts the cross-section view of the mobile home 5 through a point behind the wheel well 60, and facing the back wall 93. FIG. 4B depicts the cross-section view of the mobile home 5 through a point within the wheel well 60 and facing the back wall 93. As can be seen, the wall portion has a top plate 12, and sill plate 14, with the vertical studs 16 extending therebetween, to form the wall framing. The top plate 12 of the wall portion 9 is to be secured to the bottom plate of the roof portion 7, as will be discussed. Additionally, the sill plate 14 of the wall portion 9 is to be secured to the floor portion 8 of the mobile home 5. The sill plate 14 may be secured with fasteners utilized to secure the wall and floor portions 8, 9 together. Such fasteners may optionally penetrate entirely through floor portion 8, and further penetrate through a self-sealing gasket layer, and be secured to the trailer chassis 50, as will be discussed. Alternatively, the fasteners utilized to secure the sill plate 14 for the wall portion 9 may be configured to penetrate partially through the flooring portion 8 and need not necessarily reach down to or penetrate through the vapor barrier membrane 70 overlying the trailer platform, as will be discussed. In an embodiment, a combination of fasteners that secure one or more of the sill plates 14 through the floor portion 8 and to the frame rails 52, 54, and fasteners that secure the one or more sill plates 14 to the floor portion 8 by penetrating only partially through the floor portion 8 may be utilized.

As shown in FIGS. 2 and 4B, to accommodate the wheel well 60, a portion of the side wall 91 framing may be adjusted, such as by shortening the length of the vertical studs 16 over the wheel well, and raising the sill plate 14, and providing insulation foam board directly over the wheel well, such that the framing can box in the wheel well 60, yet still provide adequate structural support for the wall portion 9 located over the wheels and provide some level of insulation protection.

Figures 13, 14:
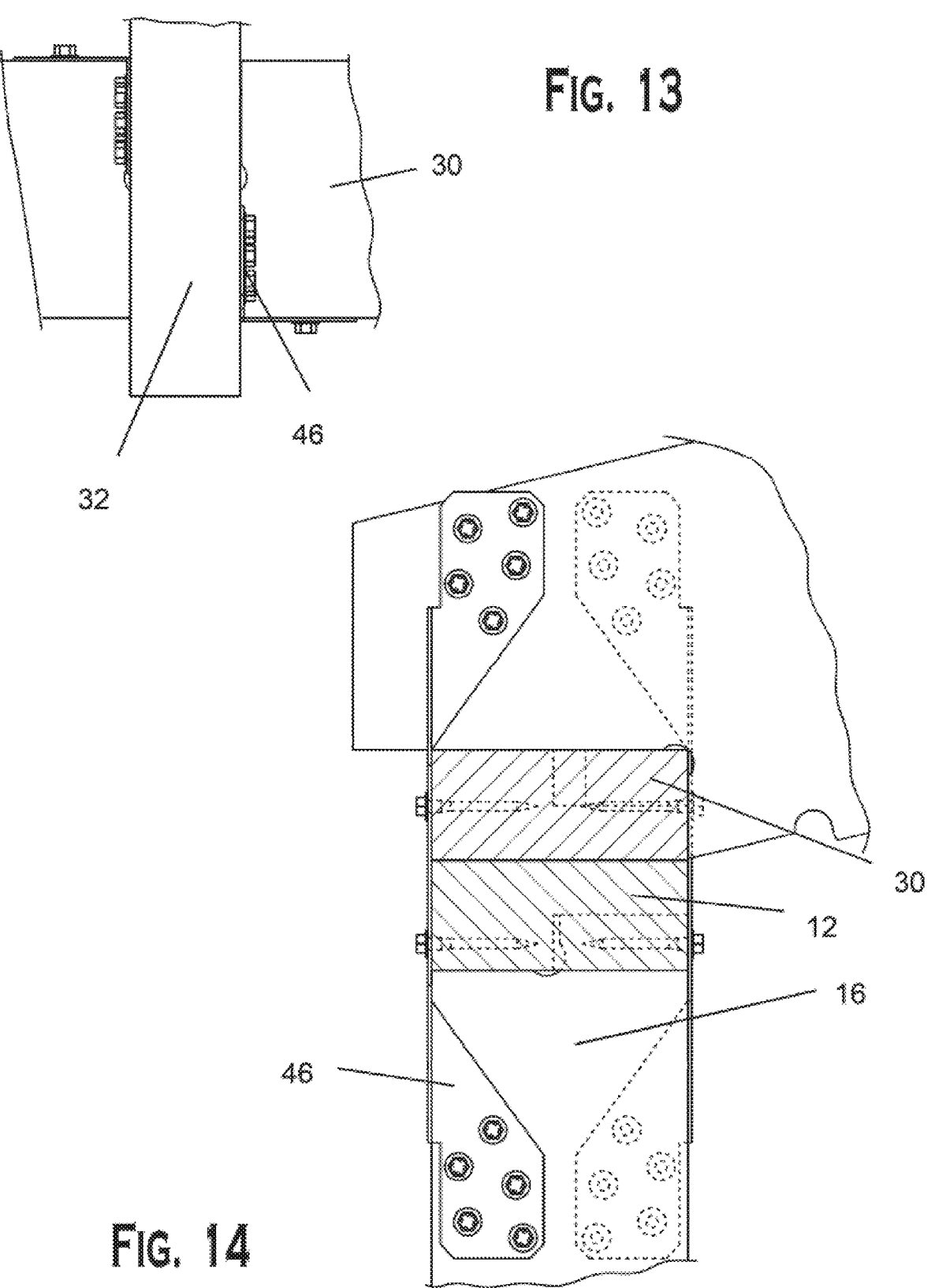
FIG. 13 is a plan view of the roof rafter and the bottom plate as they are joined to the wall portion by a tie.
FIG. 14 is side view in detail of the rafter, bottom plate, top plate, stud as they are joined by the use of one or more ties.

With reference to FIG. 6, aspects of the wall portion 9 will be discussed. FIG. 6 depicts a representative portion of a wall panel of the wall portion 9, with the wall panel having an exterior sheathing panel 20 applied on the outside portion of the wall framing, against the vertical studs 16. Such exterior sheathing panel 20 may optionally be a sheathing panel incorporating a layer of foam insulation. In such an embodiment, the exterior sheathing panel 20 may have adhered to the inside facing surface of the exterior sheathing panel 20 a uniformly dimensioned insulation panel, such as styrene or polyisocyanurate foam board that is glued or otherwise secured. The exterior sheathing panel 20 may further provide a barrier membrane, as discussed. The exterior sheathing panel 20 may be mechanically secured with a plurality of fasteners (e.g., screws, nails) directed through the exterior skin into the vertical studs 16, and/or continuous header bar 17 or rail 15 to affix the exterior sheathing panels 20 to the framing. To maintain the integrity of the barrier membrane of the exterior sheathing panel 20, a sealant or tape layer may be applied over each of the penetrations through the vapor barrier, as is known to those of skill in the art. As shown in FIG. 6, where the exterior sheathing panel 20 provides a layer of insulation, the insulation layer is provided on the interior aspect of the exterior skin and may optionally be notched or partially removed in specific areas (such as is shown at the top of the panel depicted in FIG. 6) in order to accommodate the end of the roof rafter 32, as it is joined to the wall portion 9, as will be discussed. In this manner, the exterior sheathing panel 20 may be adhered directly to the outside edge of the rafter, without the insulation of the outside sheathing, if any, interfering with the junction. In such an embodiment, the rafter should protrude beyond the edge of the bottom plate by the thickness of the insulation provided on the exterior skin sheathing, as depicted in FIG. 14. In an alternative embodiment, where there is no insulation layer provided on the exterior sheathing panel 20, and instead adequate insulation can be had by filling the wall cavities between the studs 16, in this case, the rafter 32 may be terminated flush with the outside edge of the bottom plate 30, such that the exterior sheathing panel 20 can be applied against the studs 16 and continue up to enclose the rafters 32.

Referring again to FIG. 6, the wall is provided with an interior sheathing layer, which may also be in the form of one or more interior sheathing panels 18. In contrast to traditional construction techniques, where the outside skin is used to provide a level of structural reinforcement for the stud framing, by reinforcing along the plane of the sheathing, the present invention utilizes a mode of securing the interior sheathing panels 18 to the framing components of the wall panel, such that the interior sheathing panel 18 is physically locked together with the framing, such as the studs 16, and forms an essential structural aspect of the wall unit of the wall portion 9. Furthermore, the mortise 24 and tenon 22 connection provides self-registration when applying the inside sheathing panel 18 to the studs 16 of the wall framing, as the interior sheathing panel 18 can only be applied to the framing in a location where the tenons 22 of the studs 16 will fit into the mortises 24 of the interior sheathing panels 18. The physical locking of the interior sheathing panel 18 to the wall framing is accomplished by utilizing a plurality of mortise 24 and tenon 22 connections as will be described, with the effect that as the interior sheathing panel 18 is urged into position on the wall studs 16, the mortise and tenon connections 28 will pull the studs 16 of the framing, and the wall unit into a square position, as the framing is trued into the proper orientation, and any warp in the studs 16 is minimized as a consequence of the tenons 22 urging the stud 16 into proper alignment, as the tenon engages with the mortise 24 to for each mortise and tenon connection 28. With reference to FIG. 6, each of the vertical studs 16 of the depicted wall portion 9 is secured to the interior sheathing panel 18 by tenons 22 provided on the inside surface of the studs 16, that engage with a corresponding mortise 24 provided in the interior aspect of the interior sheathing panel 18. In an embodiment, the connection 28 utilizes a blind mortise and tenon, as will be described.

The self-aligning benefit resulting from the mortises 24 of the interior sheathing panel 18 being caused to engage with the tenons 22 of the studs 16 of the wall framing, as depicted in FIG. 7, and urging the wall, for example, sidewalls 91, front walls 92, and back walls 93, into a square and true construction provides the benefit of tight tolerances as the wall portion 9 is assembled, and such tight tolerances allow the resulting structure, as it incorporates square and true walls, to accurately meet the plan design. The uniformity in construction allows faster production, and reduced time addressing out of tolerance builds, thereby speeding up and facilitating mass production. Furthermore, as the tight tolerance of build is enhanced by the design of the components utilized in the construction, there is less need to rely on the skill of the builder to address tolerance issues and reducing the skill threshold required for the construction from that of a highly proficient cabinetry carpenter, to that of a less experienced assembler. Therefore, the construction components and techniques described herein allow for faster, and more accurate production, and accordingly would require less customization and adjustments, and less skill required during the build to accurately meet the plan design.

FIG. 7 depicts an enlarged detail view of one of the plurality of tenons 22 provided on the studs 16 of the framing components of the wall portion 9. Each of the tenons 22 provided is in the form of a protruding portion of the stud 16 that extends inwards beyond the remainder of the stud inside surface. The interior sheathing panel 18 will be provided with mortises 24 in corresponding locations to allow approximation of the sheathing panel 18 to the wall studs 16. As shown in FIG. 6, each of the studs 16 of the wall portion 9 is provided with four tenons 22 spaced along the length of each stud 16. One skilled in the art will recognize that alternative tenon placements are possible and may utilize a different number of tenons provided on the wall framing. So long as there is adequate connection and physical engagement of each of the sheathings to the plurality of studs, the varying tenon placements fall within the spirit of the invention.

FIG. 8 depicts an enlarged detail view of one of the plurality of mortises 24 provided on the interior surface of the interior sheathing panel 18. Each of the mortises 24 are in the form of recesses shaped to accommodate the protruding portion of the tenon 22 therein and are placed on the interior sheathing 18 in locations where they will receive the corresponding tenons 22, when the interior sheathing panel 18 is mounted onto the studs 16 of the wall framing, by approximating the interior sheathing panel 18 to the wall studs 16 as indicated by the arrow depicted in FIG. 6.

As can be seen with reference to FIGS. 7 and 8, the inside corner features of one or both of the mortise 24 and tenon 22 may be milled away slightly, to expand the tolerance allowed when approximating the mortise 24 and tenon 22 features together. In this manner, the planar surfaces of the perimeter of the tenon 22 will be more likely to smoothly slide against the planar surfaces of the perimeter of the mortise 24, as the tenon is caused to engage and advance into the into the mortise. It is contemplated that in an embodiment, the tenon 22 may optionally be slightly tapered, for example, at less than approximately 5 degrees off of the plane of the mortise feature, in one or both of the horizontal or vertical direction, as may be provided by having the protruding end of the tenon 22 be slightly smaller than the portion of the tenon away from the end, such that the tenon will tend to self-center within the mortise as the tenon is urged further into the mortise, and the rounded or milled away inside corners may serve to prevent the tenon from hanging up as the tenon is directed into the mortise.

Figures 9, 10:
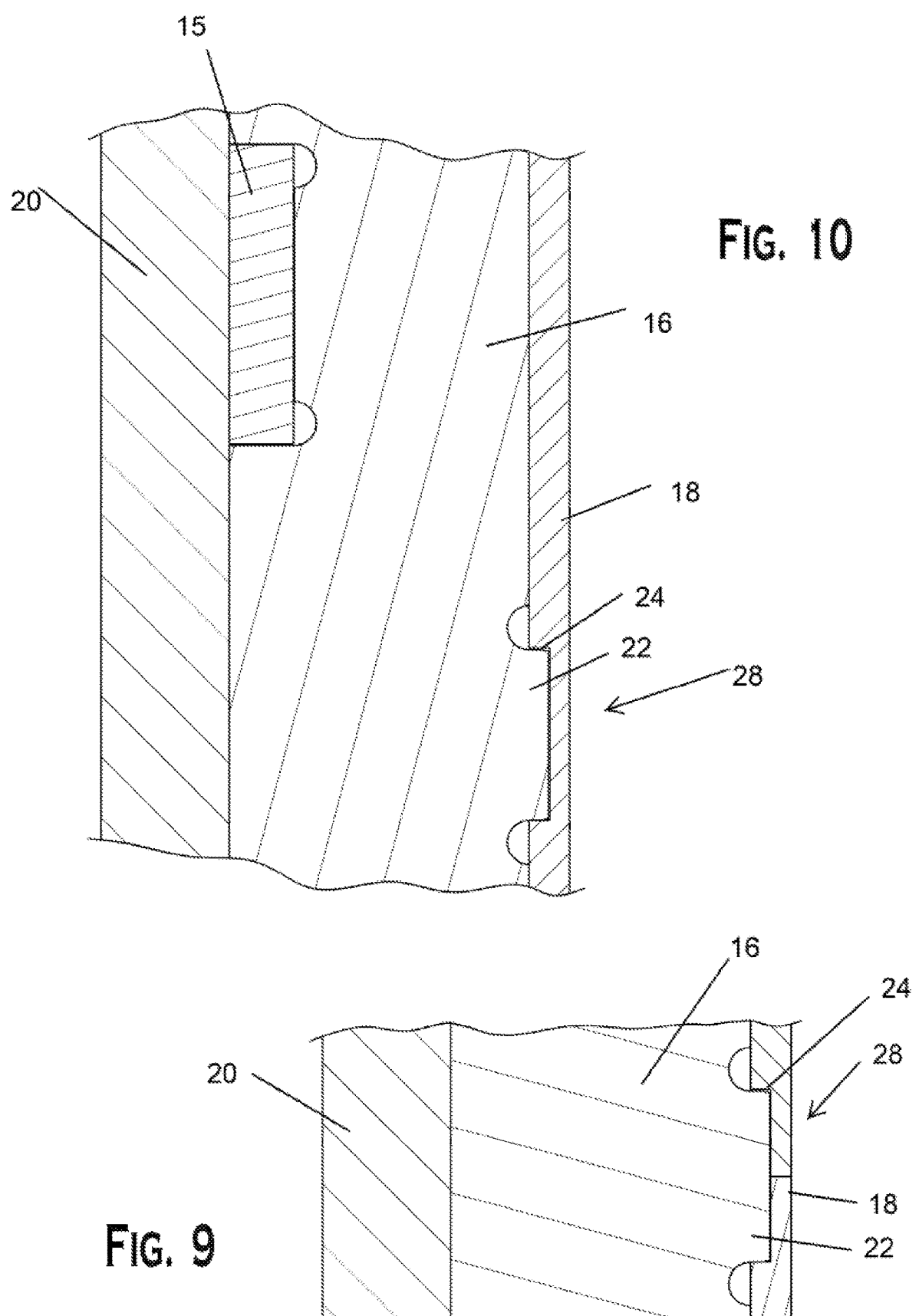
FIG. 9 is an enlarged cross-section view along the line 9-9 of FIG. 6, with the framing and panels having been joined together.
FIG. 10 is an enlarged cross-section view along the line 10-10 of FIG. 6, with the framing and panels having been joined together.

FIGS. 9 and 10 are enlarged detailed views depicting the assembled mortise and tenon connections 28. As shown in FIG. 10, the tenon 22 of the stud 16 depicted in FIG. 6 is to fit within the recessed space of the mortise 24. The fit of the components is such that the interior sheathing panel 18 is to be locked relative to the stud 16 at multiple locations via the engagement of multiple mortise and tenon connections 28, ensuring that the stud 16 and sheathing panel 18 are unable to move independently of each other. As can be seen on the opposite side (outside facing edge) of the stud 16, the rail 15 is provided and fits in a recess provided on the exterior surface of the stud 16. Such a rail 15 would be secured, via fastener, to the studs 16, and further provides additional rigidity to the wall portion 9. With reference to FIG. 9, the tenon 22 can be seen secured within the corresponding mortise 24 of the interior sheathing panel 18, only the mortise 24, as depicted, is created on the border of a pair of neighboring interior sheathing panels 18. The particular mortise 24 depicted in FIG. 9 can be seen to extend across a border of two neighboring interior sheathing panels 18 in FIG. 6. In addition to the mortise 24 and tenon 22 features providing the connections, the interior sheathing panels 18 may be further secured to the wall framing studs 16 using a plurality of fasteners (e.g., screws, nails, etc). In this manner, the sheathing will be prevented from pulling away from the stud 16, while the mortise and tenon connections 28 prevent the lateral shifting of the stud 16 framing along the plane of the interior sheathing panel 18. Once the interior sheathing panel 18 is secured to the stud 16 framing with fasteners, the sheathing will be held tight to the framing, and ensures that the wall remains square. In this manner, the wall portions 9 of the mobile home 5 can be built accurately to plan, leading to predictable construction, such that the mobile home 5 will fit properly relative to the roof portion 7, the floor portion 8, and also fit properly on the trailer chassis 50. Thus, utilizing the building techniques and components described herein, the main components of the mobile home 5 structure would be precisely located, and allows the use of modular components that can be assembled reliably to form the finished mobile home 5.

The provision of the structural reinforcement provided by securing the interior sheath panel 18 to the inside surface of the studs 16 of the wall framing, according to an embodiment of the invention, provides an advantage over traditional building techniques, in that sheathing panels providing the structural reinforcement are entirely contained within the interior of the vapor barrier, rather than having the vapor barrier mounted to the sheathing unit as is previously known. Additionally, there is greater separation of the structural reinforcement of the interior sheathing panels 18 from the vapor barrier 21 on the exterior of the wall portion 9, and thus there is reduced likelihood that any moisture penetration through the wall's moisture barrier would be able to negatively affect the structural reinforcing aspect of the interior sheath panel 18 when secured to the wall framing.

A further benefit to this construction technique is that the house framing and interior sheathing panels 18 can be prepared and assembled, without attaching the exterior sheathing panels, to provide a structurally sound unit, capable of supporting the roof portion 7, and being mounted onto the floor portion 8 and fixed to the trailer 3, thereby allowing unrestricted access to the openings 42 for routing the utility lines, such as plumbing and electricity. Once the utility lines are in place within the framing, the wall cavities between the vertical studs 16 can be filled with insulation, as is commonly done with traditional construction, then the exterior sheathing panels 20, which may incorporate additional insulation integral on the inside face of the sheathing, can be mounted to the wall framing structure. Additionally, revisions or repairs to the utility lines can be performed by removing the outside sheathing, without negatively impacting the structural stability of the mobile home 5.

The interior and exterior sheathing 18, 20 of the wall panel portion 9, may be a layer of sheathing panels substantially covering the respective face of the wall, but for any openings (e.g. doors and windows). The sheathing may be any suitable structural layer including wood, plastic, metal or other material that fits requirements of a particular use.

The exterior sheathing panels 20 may optionally provide one or both of an integral insulation layer, formed along the inside facing side of the exterior sheathing, and/or an integral barrier membrane layer 21, such as a vapor barrier layer applied to an exterior surface of the exterior sheathing 20. Such a barrier layer may be integrally formed onto the sheathing or applied onto the sheathing surface, as is known to those skilled in the art. The barrier membrane layer 21 of the exterior wall sheathing may be applied to the sheathing surface as a liquid coating, for example by spraying, dipping, or painting, as non-limiting examples, and then dried or cured onto the sheathing surface prior to deployment or use of the panel. Alternatively, the skin barrier layer may be a layer applied to the sheathing panel, using an adhesive or fasteners, and may be provided prior to, during or after the assembly of the panel. In a preferred embodiment, the barrier layer is in place on the sheathing surface prior to deployment of the panel for assembly in a modular shelter. Any suitable barrier membrane may be employed, and may beneficially provide any one or more of structural durability, thermal insulation, moisture or air barrier, and aesthetic coating, as non-limiting examples. Commonly employed wood skins may include materials such as plywood, solid wood sheathing, oriented strand board, chipboard, particleboard, and fiberboards, such as structural, medium density or heavy density fiberboards, as non-limiting examples. One skilled in the art would appreciate that the shape, size, and materials of the wall can be modified and designed for a particular use. The interior sheathing 18, and exterior sheathing 20 of any of the wall portion 9 may be affixed by the use of one or more of adhesives and fasteners between the skin and the structural components of the modular panels. For example, fasteners, such as nails or screws may be driven through the sheathing into the structural components of the wall framing, such as the vertical studs 16, and/or the top plate 12 and sill plate 14, optionally with a suitable construction adhesive.

With reference to the interior sheathing 18, generally there would be no vapor barrier provided on the internal sheathing, though a vapor barrier may beneficially be provided, for example, in a shower stall, or other regions were excessive moisture may be encountered. Furthermore, the internal sheathing may be a type of plywood that presents a smooth or otherwise finished interior face suitable for being exposed to the occupant within living quarters.

As shown in FIG. 1, the roof portion 7 is supported above the wall portion 9. The roof portion may be uniform over the length of the mobile home 5, or alternatively may vary over the length of the mobile home 5. For example, as shown in FIG. 1, the roof portion 7 provides a first section near the front of the trailer with a relatively steep pitch to the roof, and a second section with a less steep pitch to the roof. The peak of the roof, as shown in the side elevation of FIG. 5, may be continuous and uniform over the entire length of the mobile home 5. The roof portion 7 may utilize roof framing having a plurality of rafters 32, as can be seen with reference to FIG. 2. The rafters collectively support a series of roofing panels 38, forming the exterior roof surface, as shown in FIG. 1. The roofing panels 38 maybe any suitable roofing material, for example, metal roofing panels as will be familiar to those of skill in the art, though one will understand the alternative materials and designs for the roof surface may be substituted for the roofing panels. With reference to FIG. 2, each of the roof rafters 32 can be seen to extend from a bottom plate 30 at the outside side edge of the roof portion 7, towards the ridge beam 34 at the peak of the roof. The bottom plate 30 extends over the length of a continuous section of the roof. For example, as shown in FIG. 2, the roof portion 7 provides a first section near the front of the trailer that has the bottom plate 30 at a first height, and a second section towards the rear of the trailer, with the bottom plate 30 at a second and higher height than the first height. To maximize the interior dimensions of the mobile home 5, the roof sections are extended from the peak towards the sides and reach the full width of the trailer 3 upon which the mobile home 5 is mounted. The rafters 32 each extend from the bottom plate 30, to a ridge beam 34 that runs the length of the mobile home where the roof has a uniform peak along the length. For each pair of opposing rafters 32, where they meet with the ridge beam 34, there may further be provided a reinforcing gusset plate 36, that is secured to the face of the pair of rafters near the ridge beam, and the gusset plate 36 is further secured to the ridge beam 34. The ultimate shape of the reinforcing gusset plate will vary with the pitch of the section of the roof it is utilized in, as can be seen by comparing the gusset plates 36 in the first section of the roof portion to those in the second portion. As with the wall portion 9, the space between the rafters may be filled with insulation, and interior roof panels 40 secured to the underside of the rafters 32, to provide a finished interior ceiling within the mobile home 5.

Figure 5:
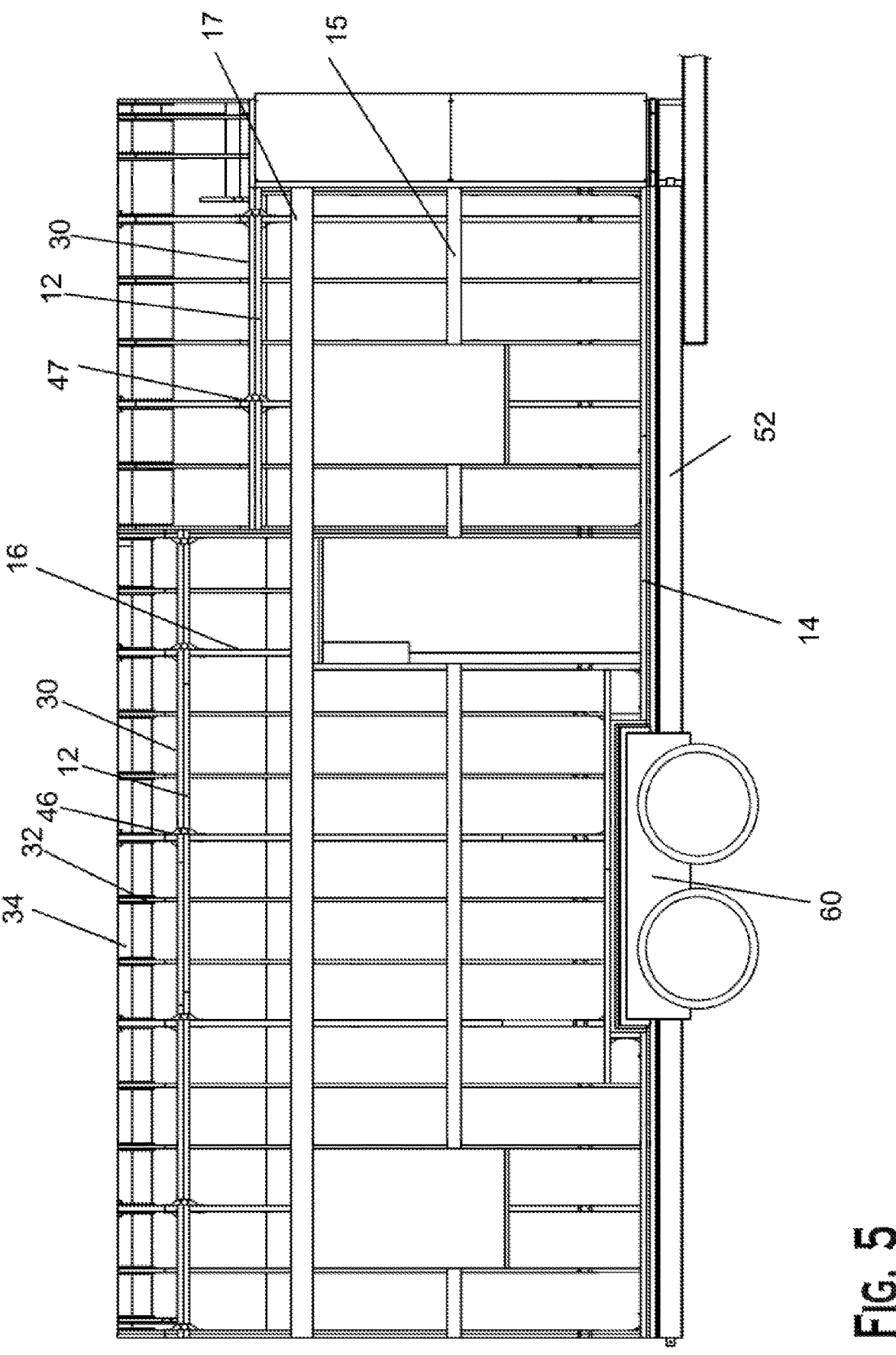
FIG. 5 is a side elevation view of the mobile home of FIG. 1, with exterior skin removed.
Figures 11, 12:
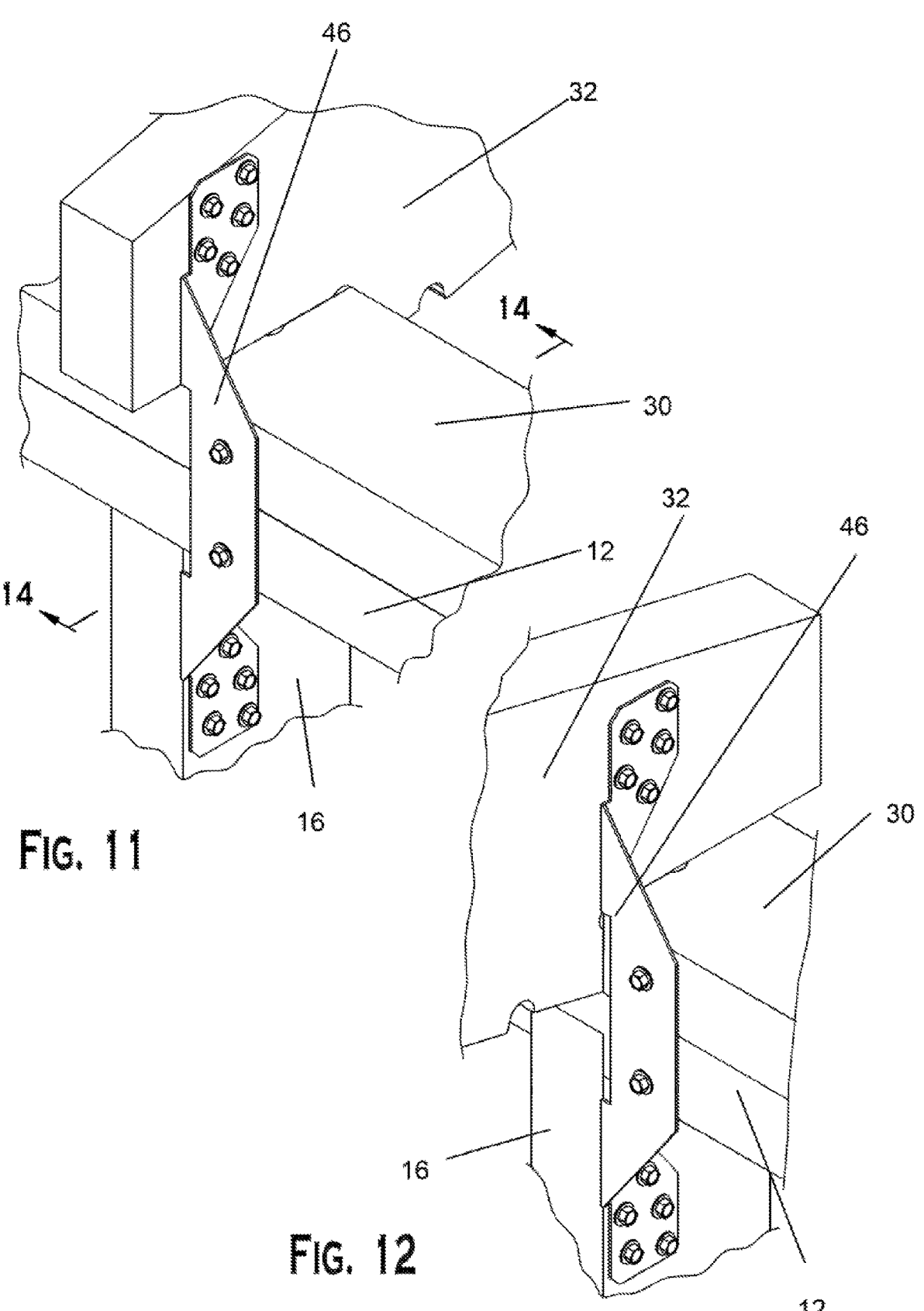
FIG. 11 is a detail of the roof portion joining to the wall portion, viewed from an exterior perspective.
FIG. 12 is a detail of the roof portion joining to the wall portion, viewed from an interior perspective.
Figure 15:
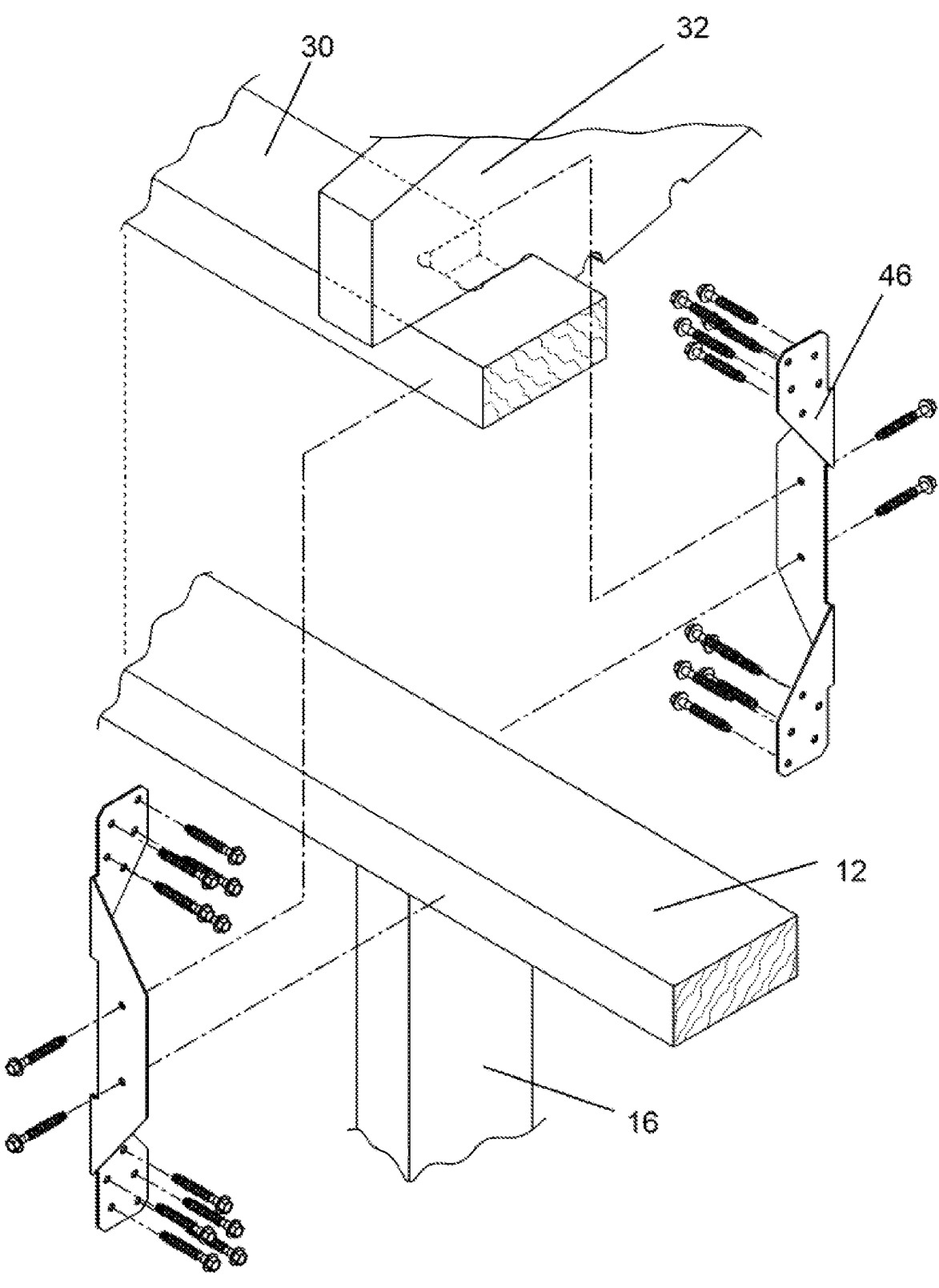
FIG. 15 is an exploded partial view of the roof and wall joint depicting the roof portion having a rafter and bottom plate that are to be joined to the top plate and stud of the wall portion by the use of one or more ties.
Figures 16, 17:
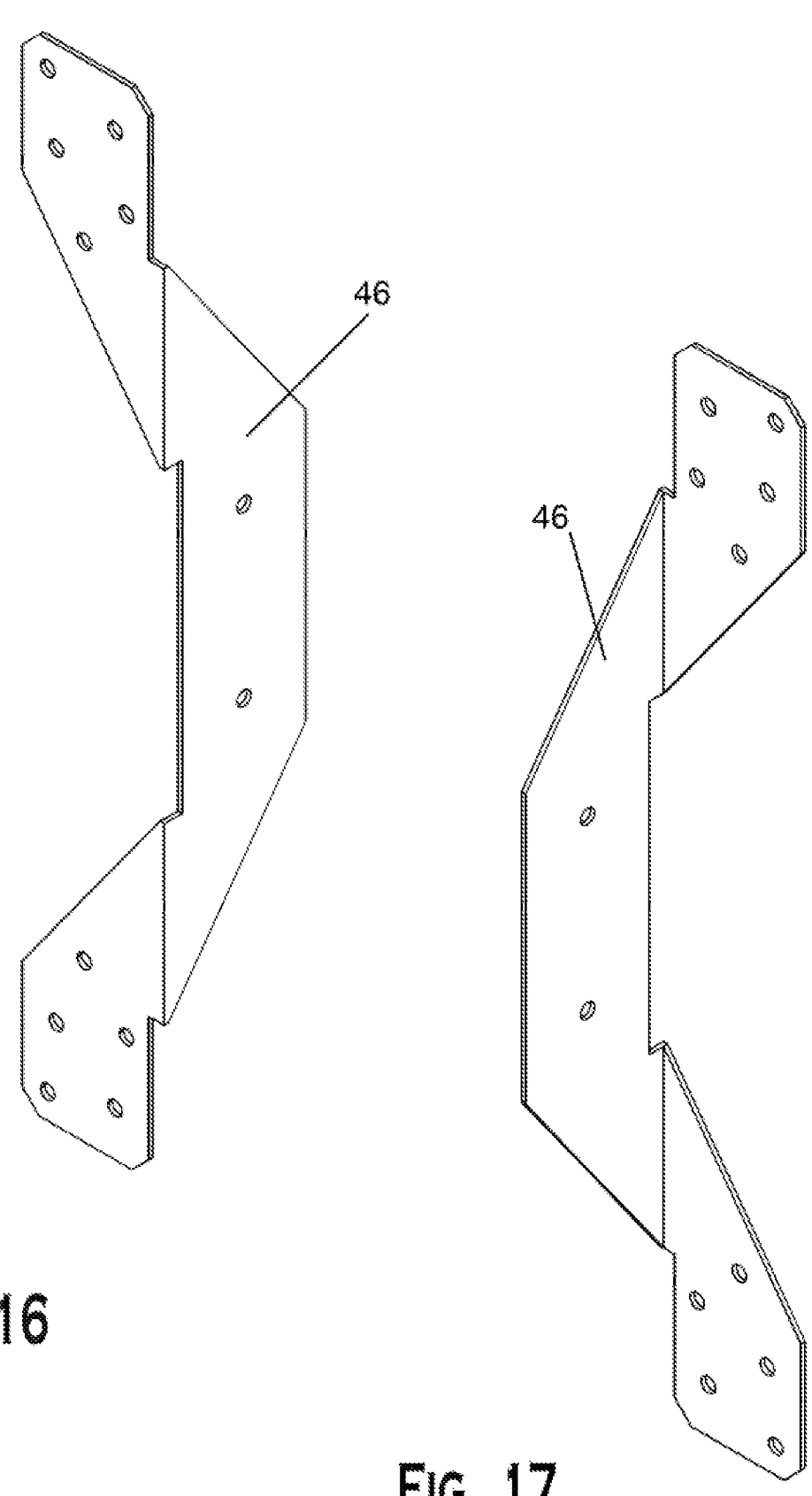
FIGS. 16 and 17 show representative ties that can be used to connect the roof portion and the wall portion.

Details of the joining of the roof portion 7 to the wall portion 9 can be seen with reference to FIGS. 11-15. Recall that the top plate 12 of each wall 91, 92, 93 of the wall portion 9 provides a planar surface, the roof portion 7 is similarly provided with a planar bottom surface with the bottom plate 30 that extends underneath the rafters for a section of the roof. Thus the roof portion 7 can be mounted to the top of the wall portion, so that the underside of the bottom plate 30 rests atop the upper surface of the top plate 12. The roof portion 7 should be placed atop the wall portion 9 such that there are at least some rafters 32 of the roof portion 7 that are vertically aligned with the studs 16 of the wall portion 9. Once aligned in this manner, the rafter 32 may be mechanically secured to the stud 16 it is in vertical alignment with, through the use of a mechanical connector, such as a tie 46 utilizing a plurality of fasteners. A representative tie 46 is shown in isolation in FIGS. 16 and 17, and in use is depicted in FIGS. 11 and 12, where FIG. 11 represents a detailed view of the joining of the rafter 32 to the stud 16, when viewed from the exterior, and FIG. 12 is the view from the interior perspective. As shown, the tie 46 is secured via fasteners applied in a middle portion of the tie to the bottom plate 30 and top plate 12, and at each end of the tie 46 is secured to either the side face of the rafter 32, or the side of the stud 16, respectively. Such tie connections can be made, if deemed necessary to every stud and rafter that are vertically aligned, or may be spaced along the length of the mobile home 5, as depicted in FIGS. 2 and 5. In this manner, the roof portion 7 will be adequately secured to the wall portion 9, such that the roof will resist lifting off under windy conditions, or when the mobile home is being towed. FIG. 15 depicts the exploded view of the components for joining the roof portion 7 to the wall portion 9, and the placement of the mechanical fasteners through the tie 46 to ensure the bottom plate 30 remains securely mounted to the top plate 12. Additional views of the connection of the tie 46 can be seen with reference to FIGS. 13 and 14. FIG. 13 depicts the top view of the rafter 32 and bottom plate 30 when they are connected to the wall portion 9 through the use of a pair of ties 46. FIG. 14 depicts the side view of the connection of the rafter 32 to the stud 16 through the use of ties 46. As shown, the rafter 32 is securely fixed relative to the stud 16, and further the bottom plate 30 is securely resting atop the top plate 12, thereby securing the roof portion 7 to the wall portion 9. As can be seen with reference to FIG. 2, the use of the ties 46 may be spaced along the length of the mobile home 5, being utilized at approximately every third rafter along the length. The number and frequency of tie connections required will vary with the design requirements of the mobile home 5, as will be familiar to those of skill in the art. It is contemplated that not every rafter need be aligned with the studs, for example where the spacing between adjacent studs 16 along a wall is different from the spacing between rafters 32 in the roof portion 7; but there must be some rafters spaced along the length of the mobile home that are aligned, to allow the mechanical connection with the tie 46, to ensure that the roof portion 7 will not move from place atop the wall portion 9, and remains secure while in motion under tow, and in the event of severe weather.

Figure 3:
FIG. 3 is a bottom-side perspective view of the mobile home of FIG. 1, and depicting aspects of the trailer supporting the mobile home, according to the invention.

As can be seen with reference to FIG. 3, the trailer 3 for the mobile home 5 provides a tongue extending from the chassis of the trailer, and forward from the trailer, and a coupler configured to receive a hitch of a vehicle for towing. The trailer chassis connected is suspended above at least one axle with a pair of road wheels. In an embodiment, as shown in FIGS. 1 and 3, the trailer 3 is a dual axle trailer, with each axle having a pair of road wheels 58 upon which the trailer may be moved. Such trailer components will be familiar to those of skill in the art. The chassis 50 provides a pair of inner frame rails 54 that extend longitudinally, substantially along the length of the trailer, but for the extending tongue portion. Outward from the central longitudinal axis of the trailer, and parallel to the inner frame rails are the outer frame rails 52, that extend along the length of the trailer as well, only the outer frame rails are interrupted by the placement of the road wheels 58 within the wheel well 60. The inner frame rails 54 and outer frame rails 52 form structural box members at the outermost sides of the trailer 3, as can be seen with reference to FIG. 3. Each of the inner and outer frame rails 54, 52 are provided at a uniform height along the length of the trailer 3, as can be seen in the cross-section view of FIG. 4A, and form a perimeter of the trailer platform upon which the floor portion 8 of the mobile home 5 may rest. The structural components of the trailer, such as the chassis 50 providing frame rails 52, 54 and cross rails 56, may be any suitable construction, such as aluminum, or steel. With reference again to FIG. 3, extending between, and orthogonally to the inner frame rails 54 are several cross-rails 56, that provide ladder frame construction for the trailer, such that trailer will be rigid, and capable of supporting the weight of the mobile home 5. As depicted in FIG. 4A, each of the cross rails 56 are placed with their upper surface that is shorter in height than the inner and outer frame rails 54, 52, and may be positioned such that the bottom of the cross rails 56 will be at the same height as the bottom of the inner and outer frame rails 54, 52. In an embodiment, the inner and outer frame rails 54, 52 are approximately six inches in height, and the cross rails 56 are approximately four inches in height. It is contemplated that alternative sizes for the frame rails are possible, but generally seek to provide at least approximately a two inch height difference between the height of the top surface for each of the inner and outer frame rails over the height of the top surface for the cross rails. To provide a uniform trailer platform for the placement of the floor portion 8 thereon, there is provided a layer of insulating foam board, to form an insulation board riser 72 that fits within the reduced height portions of the chassis 50, between the inner and outer frame rails 54, 52 of the trailer 3, and extending above the cross rails 56 of the chassis 50. In an embodiment, the insulation board riser 72 is a 2" rigid foam board. The foam board utilized for the insulation riser 72 thus may be of a thickness that will bring the topmost surface of the foam board, when it is positioned residing on the cross rails 56, and optionally on a debris shield, and residing within the spaces in the trailer 3 that are located between the inner frame rails 54, as well as in the side box(es) created between the inner frame rails 54 and outer frame rails 52, to provide a uniform consistent height for the trailer platform, as can be seen in FIG. 4A, and in greater detail in FIG. 19. The insulating board riser 72 thus forms the substantial majority of the top surface area of the trailer platform, and provides a substantial increase in thermal isolation from the trailer chassis, compared to traditionally framed tiny homes mounted directly on trailers with no provision for a thermal break over a significant portion of the trailer chassis, as the traditional construction resulted substantial direct contact between the frame rails and cross rails of the trailer with the floor of the previously known mobile home construction. For example, where the traditional constructed house is provided on a traditional trailer design, and is approximately 28 feet in length, it is anticipated that between 17 and 20 percent of the floor surface area will be direct contact with the trailer frame of the prior art design. With the current invention, by providing a thermal break in the form of the insulation board riser 72 between the majority of the trailer chassis 50 and the floor portion 8 of the present invention, it is anticipated that a much smaller portion, typically only 4-5% of the trailer platform for a 28 foot trailer, will have direct contact between the chassis 50 and the floor portion 8, with the balance of the trailer platform being the insulation board riser 72, thereby significantly reducing the extent of heat transfer between the trailer 3 and the floor portion 8. The foam board provided for the insulation riser 72 may be any suitable insulating board, such as an expanded polystyrene board, though it is contemplated that other insulating boards may be alternatively used, such as other forms of styrene, or polyisocyanurate. Preferable, the insulation form utilized for the insulation riser would be a closed cell foam, to avoid significant moisture penetration, as the insulation riser 72 would be positioned below the vapor barrier 70, and therefore must be resistant to damage from exposure to moisture. This insulation riser 72 when properly positioned within the chassis 50 provides a level surface at the top of the trailer platform, upon which the vapor barrier 70 and components of the floor portion 8 can be placed, as will discussed below. Below the insulation board riser 72, there may be provided a shield 74, such as a layer of corrugated plastic, that can serve as armor to shield the underside of the insulation riser from damage due to impact from road debris, as well as damage from splashing water as the trailer is towed, and also serve as a barrier to prevent pests, such as rodents from nesting within the insulation, or within the spacing of the trailer frame. The insulation board riser 72 also beneficially serves to isolate the floor portion of the mobile home from contact with a substantial portion of the trailer, and thus serves as a thermal break, to prevent the cold or heat from the trailer being conducted into the living space via the floor portion 8 of the trailer 3. Also provided atop the inner frame rails and the outer frame rails may be a gasket material 55, such as butyl tape. Thus, collectively, each of the inner and outer frame rails, with butyl tape thereon, and the insulation board riser sections positioned within the frame rails will provide a trailer platform of consistent height within the dimensions of the trailer, upon which the mobile home may be placed, as will be discussed. It is further contemplated that in some embodiments, the butyl tape may not be required where the vapor barrier is one that is capable of providing the self-sealing property, to seal against any fasteners that are caused to penetrate through the vapor barrier layer, as the structure of the mobile home 5 or the floor portion 8 is caused to be secured to the chassis 50.

Figure 18:
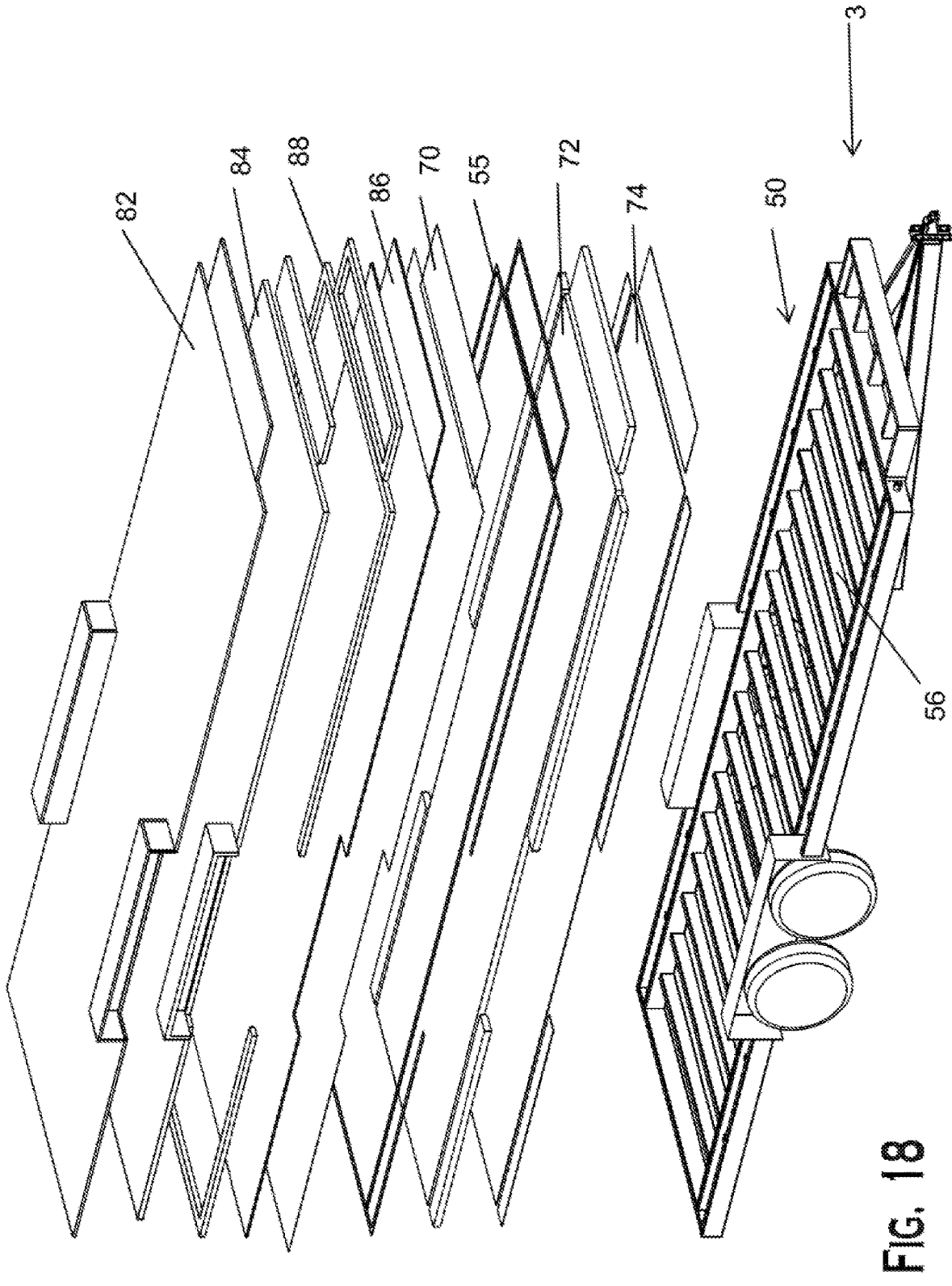
FIG. 18 shows an exploded view of the bottom floor portion and the supporting trailer.

In an embodiment, the trailer platform may be extended over the tongue portion of the trailer 3, as can be seen with reference to FIG. 18, such as by providing an extended tongue frame, which may be a moisture resistant material, such as being the same material as the frame rails, or alternatively, may be a pressure treated lumber material. Such a tongue frame would provide a perimeter frame at the same height as the frame rails 52, 54, and include support pieces positioned within the perimeter frame, positioned at a height that matches the cross rails. As with the main trailer frame, a debris shield, and insulation board riser may then be placed within the perimeter frame to extend the platform for placement of the mobile home thereon, as depicted in FIG. 1, and increase the usable interior living area for the mobile home 5.

In order to ensure that the mobile home 5 is protected from moisture damage, a vapor barrier layer 70 may be located over the entirety of the surface of the trailer platform described above. In an embodiment, the vapor barrier is adhered directly to the bottom surface of the floor portion 8, for example, by using an adhesive. The components and design of the mobile home 5 is such that everything located below the moisture barrier 70 will be generally insensitive to the presence of moisture, while everything that is positioned above the barrier layer sheet 70 will be protected from moisture infiltration, thereby ensuring the mobile home 5 will be free from water damage due to exposure to the elements. The vapor barrier layer 70 may be any suitable membrane vapor barrier or moisture barrier, and may be, in an embodiment, a polymer sheet, such as polyoxymethylene, and sized to extend beyond the dimensions of the trailer platform. The excess portion of the vapor barrier layer 70 can be folded up around the exterior of the house components when mounted on the trailer 3, and folded portion of the vapor barrier 70 is to be secured to the vapor barrier or outer membrane 21 that surrounds the external aspects of the wall portion 9 described above. The vapor barrier layer 70 positioned underneath the house components can be bonded with the wall vapor barrier 21 with a weatherproof seal, such as butyl tape. In this manner, there is an impermeable barrier formed around the bottom and sides to protect the wood components of the mobile home from moisture exposure.

The floor portion 8 of the mobile home 5 can then be secured atop the vapor barrier layer. As depicted in FIG. 18, the floor portion 8 comprises a laminate of sheathing and insulation layers, that are glued together to form a single piece rigid platform that is both insulating to prevent thermal transmission through the floor, as well as provide adequate structure to support the loads expected within the house, and suitable for the occupant to walk on, place furniture on, and live above. As depicted, the floor platform 8 comprises when viewed from top to bottom, a top sheathing layer 82, a foam insulation layer 84, and a bottom sheathing layer 86. The panels for each of the layers 82, 84, 86 will be assembled with the seams between adjacent panels staggered, to provide a consistent, monolithic platform, with the staggered panels providing enhanced rigidity and thermal insulative properties of the floor portion 8. Additionally, the lamination of several layers together tends to eliminate bowing in any one or more of the layers to provide a uniform, and flat flooring platform within the mobile home structure, provided as the floor portion 8.

The top sheathing layer 82 of the flooring portion 8, in an embodiment, is a layer of wood sheathing. The top sheathing layer 82 must be thick enough to support weight applied directly to the top face without flexing or distorting significantly, and must be able to resist impacts and denting as the occupant utilizes the living space, for example, as furniture is moved across or sat upon, and occupants are walking over the top sheathing layer 82. In an embodiment, the topmost surface of the top sheathing layer 82 will be in view to the occupant, the top sheathing layer 82 should also provide a visible face that will be attractive, and may optionally be capable of being finished, such as by applying liquid polyurethane. Alternatively, the floor portion 8 is a subfloor, and a finish flooring may optionally be provided atop the top sheathing layer 82 of the laminate subfloor, for example, luxury vinyl planks or tiles, may be applied over the subfloor. The finish flooring may be any suitable flooring planks, sheets, tiles, or carpet, that the user may wish to apply, but care should be taken to avoid installations that are not compatible with small vibration or small amounts of movement, such as tiles set in thin set or mortar, as the floor may be caused to vibrate and move, especially while in transit, and brittle installations might crack or fail, especially while in transit. In an embodiment, the top sheathing layer 82 is a wood sheathing, and may be ¾ of an inch thick panel. In an embodiment, the top sheathing layer is a subfloor panel, and may be, for example, oriented strand board, plywood, solid wood sheathing, oriented strand board, chipboard, particleboard, or fiberboard.

The foam insulation layer 84 is provided between the top sheathing layer 82 and the bottom sheath layer 86. The foam insulation layer 84 provides additional insulation beyond that of the riser layer, but must also be resistant to crushing, such that as heavy loads are placed on the flooring, the foam layer 84 does not collapse, and thus would provide resistance to the formation of depressions in the flooring. In an embodiment, the insulation layer 84 is a two inch thick foam board. In another embodiment, the insulation layer 84 is a one and a half inch rigid insulation board. The insulation layer may be any suitable insulating foam board, such as a styrene foam sheet, for example expanded polystyrene (EPS), or extruded polystyrene (XPS) or alternatively other insulating foam board, such as polyisocyanurate sheets may be utilized. The foam board should provide resistance to crushing and/or be resilient, such that if some compression occurs through the floor portion, the insulation would not remain crushed, but rather would rebound to its original thickness. In an embodiment, the foam insulation layer 84 may additionally be reinforced to resist crushing by incorporating wood ribbing 88 placed at strategic locations in the layer. For example, as depicted in FIG. 18, the wood ribbing generally forms a perimeter around the foam board of the foam insulation layer 84, and may additionally form a perimeter around the portion of the foam insulation layer that resides within the tongue frame above the tongue. It is further contemplated that such wood ribbing 88 may also be provided within the foam insulation layer 84 in areas of high traffic, or underneath fixtures or furniture that would place significant loads upon the flooring, such as locations where a refrigerator is to be placed within the mobile home 5. The wood ribbing should be of a thickness that is the same as the thickness of the foam insulation layer 84 it is protecting. It is recognized that the ribbing 88 may alternatively be a plastic or metal ribbing, such as aluminum I-beam or hollow square channel pieces of the same height as the foam layer it is placed within.

The bottom sheathing layer 86 of the floor portion 8, in an embodiment, is a layer of wood sheathing. The bottom sheathing layer 86 provides a solid surface to which the foam insulating layer 84 is glued directly to. In an embodiment, the bottom sheathing layer is a wood panel sheathing, and in an embodiment is a oriented strand board sheathing that is approximately ⅜ᵗʰˢ of an inch thick. The bottom sheathing panel may be any suitable panel made from, for example, oriented strand board, plywood, solid wood sheathing, oriented strand board, chipboard, particleboard, or fiberboard. The vapor barrier may optionally be adhered to the underside surface of the bottom sheathing layer 86, such that the floor portion 8 can be placed atop the trailer platform, and the vapor barrier will be positioned between the floor portion 8 and the trailer platform.

The floor portion 8 as described above provides a stable floor structure, and thus may be secured to the trailer chassis 50 with only a small number of fasteners directed through the laminated floor portion 8, penetrating through the vapor barrier 70, and secured into the frame rails 52, 54. Recall that butyl tape or other sealant may be placed between the vapor barrier 70 and the frame rails 52, 54, such that as the vapor barrier is penetrated by the fasteners to secure the flooring to the chassis 50, the butyl tape will serve to seal the opening, as it has self-sealing properties, and thereby preserves the functional integrity of the vapor barrier 70. The flooring portion 8 forms a single piece, rigid monolithic unit, as it is both rigid and uniform over its entire dimensions, as the laminate of layers 82, 84, 86 are adhered together with adhesive applied between each layer. The monolithic form of the floor portion 8 thereby allowing the use of a small number of fasteners in order to properly secure the floor portion to the trailer chassis. Thus the present invention avoids the need to utilize many fasteners directed through each of the flooring panels, in contrast to the manufacture of flooring that is made up of discrete flooring panels that are each fastened individually to the chassis, which would necessarily require repeatedly penetrating through the vapor barrier 70. In this manner, the present invention avoids the need to penetrate the vapor barrier many times for each sheathing panel, and instead minimizes the number of penetrations required in order to securely attach the floor portion 8 to the chassis 50, and more specifically, into the frame rails 52, 54. In an embodiment, the number of fasteners required would be significantly less than amounts utilized for previously known applications, as previous installations utilized approximately one thousand or even more fasteners, since the prior known securement techniques secure the flooring as independent panels that are directly secured to the cross-rails and frame rails, panel by panel, often only 2 to 3 inches from adjacent fasteners around the perimeter of each panel. Thus, it would be expected to utilize the over one thousand fasteners for the prior art technique, with each of the over one thousand fasteners penetrating through the flooring, any vapor barrier, if present, to secure individual panels to the trailer. In contrast, the present invention, utilizing the techniques described herein, provides for the installation of the laminated subfloor as a single-piece rigid body to the frame rails, requiring far fewer penetrations of the vapor barrier to secure the rigid floor portion 8, and would be expected to utilize less than 100 fasteners, less than 75 fasteners, less than 50 fasteners, to secure the floor to the trailer 3, and requiring a matching number of penetrations through the vapor barrier, which would then be sealed by the presence of the butyl tape on the frame rails 52, 54 of the chassis 50, or addressed with other sealants. Thus, relative to the prior art, the number of penetrations for the practice of the present invention would be reduced by at least 75% the number of penetrations from the prior art, and in an embodiment, be reduced by at least 90%, or be reduced by at least 95% of the fasteners required compared to those known by prior traditional mobile home construction techniques, characterized by having each panel of the flooring secured independently to the trailer chassis.

Where the flooring portion 8 is impacted by the wheels and the wheel wells, layers of the flooring portion may be adjusted to box in over the wheels and the wheel wells, as can be seen with reference to FIG. 18, where the insulating layer 84, and the top sheathing layer 82 or other framing and panels, are built up to surround the wheel well. This is depicted in greater detail in FIG. 4B.

Figure 19:
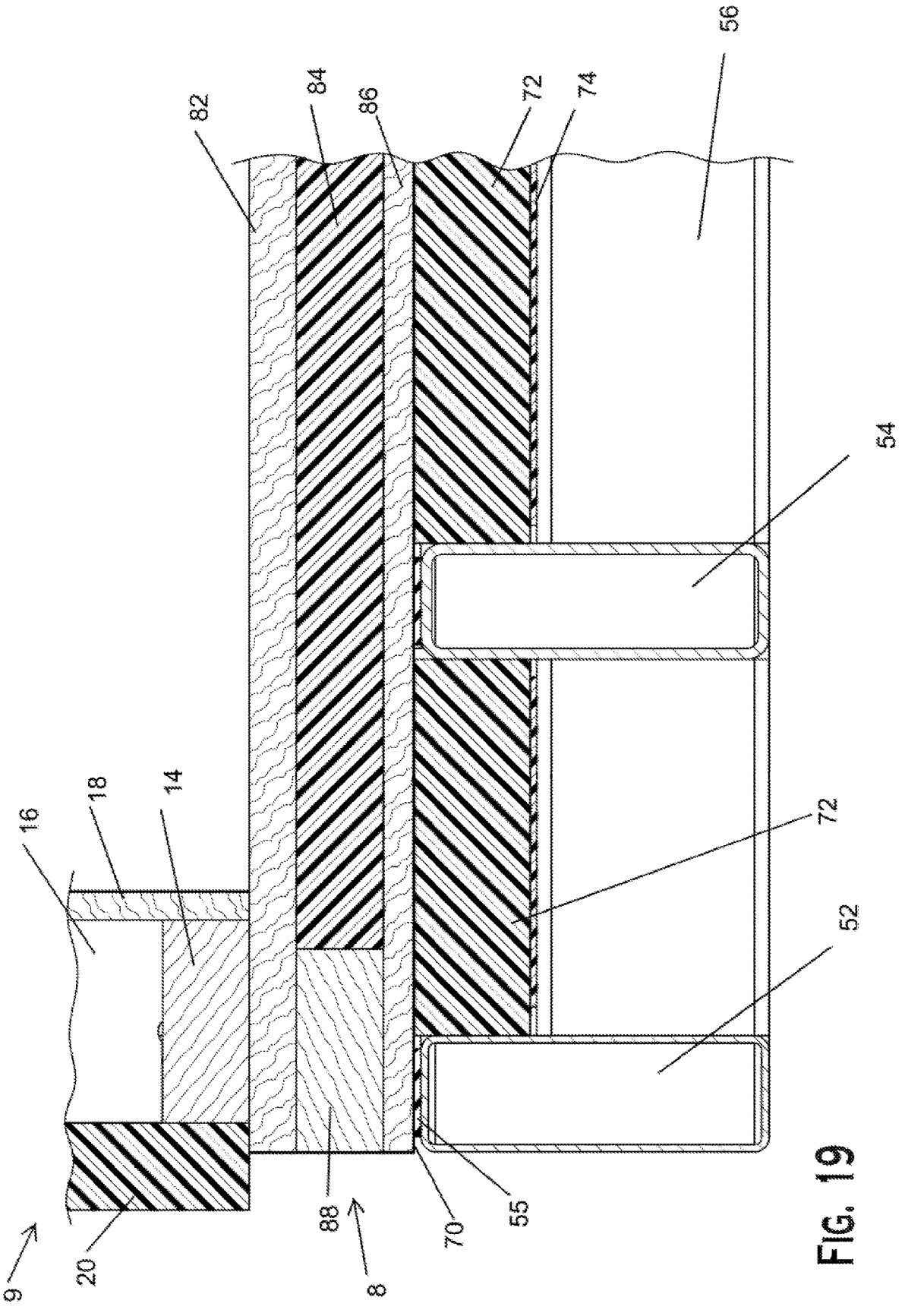
FIG. 19 is a partial sectional view in cross-section depicting the frame rails of the trailer, and bottom floor portion set on the trailer, and part of the wall extending up from the floor.

FIG. 19 depicts an enlarged detail view of the junction of the wall portion 9 with the flooring portion 8, and placement over the trailer platform. The top surface of the frame rails 52 and 54 are provided at a uniform first height, and the top surface of the cross rails 56 are provided at a second height that is lower than the first height of the frame rails. The difference in height should be approximately equal to the thickness of the insulation riser 72 and the shield 74, allowing for the small height effect owing to the presence of the butyl tape layer atop the frame rails. As depicted in FIG. 19, the vapor barrier membrane 70 rests upon a trailer platform that is of uniform height extending over the chassis 50 of the trailer, with the insulation riser 72 and shield 74 residing on top of the cross rails 56 to provide a generally planar surface for the floor portion 8 and vapor barrier layer 70 to rest upon.

Thus utilizing the teachings herein, the mobile home 5 that is constructed would provide enhanced protection from severe temperatures and moisture infiltration. This can be achieved as a result of providing improved thermal management throughout the design and construction of the structure, for example, by providing reduced thermal bridging between the trailer 3 and the flooring portion 8. The previously known, traditional mobile home construction techniques provided the frame rails as well as the cross rails in contact with the underside of the flooring, thus there would be significant thermal bridging between the subfloor as all of the frame rails and cross-rails of the trailer would be in position to be a thermal bridge. By contrast, the mobile home 5 as taught herein provides a subfloor that has two distinct layers of continuous rigid foam over the cross rails, and thus effectively breaks most of the thermal bridging that would occur.

As described herein, the lower layer of continuous rigid foam is provided in the insulation riser 72 that overlays the cross-rails entirely, and reduces the surface area where thermal bridging can occur by approximately 95%, leaving only the frame rails 52, 54 in contact with the flooring portion 8, through the vapor barrier membrane 70. Additionally, the second continuous rigid foam layer is provided within the flooring portion 8, as the foam insulation layer 84 is sandwiched between the top sheathing layer 82 and the bottom sheathing layer 86. Thus the interior of the mobile home 5 has very little potential for thermal bridging with the trailer 3 chassis 50. It follow then, the design plan for the mobile home 5 on the trailer 3 as described herein provides a very substantial reduction in the surface area of contact between the chassis 50 and the flooring portion 8 (through the vapor barrier 70), and effectively substantially reducing the extent of thermal bridging, as the cross rails are entirely removed from thermal bridging with the flooring portion 8 due to the presence of the insulation riser 72 that is resting atop the cross rails 56. The insulation riser 72 as described not only provides thermal insulation from the cross-rails, but also provides a uniform height for the entirety of the trailer platform; as the insulation riser 72 provides a top surface at the same height as the top surfaces for each of the inner and outer frame rails 52, 54, and provides a uniformly flat surface upon which the barrier membrane 70 and the flooring portion 8 may be positioned.

Applicant notes that previously known construction techniques, with the subflooring provided resting directly upon both the trailer frame rails and cross-rails, as commonly provided in the past, even if insulated, due to the excessive levels of thermal bridging with the frame of the trailer, would be expected to yield an average R-value of such a sub-floor assembly as less than R-8, more typically around an R-6. Even assuming that insulation is properly added to the prior art designs, by placing batting or other forms of insulation between rails of the trailer framing, there remains significant thermal bridging.

By utilizing the teachings herein to provide a trailer with the frame rails at a first height, and the cross-rails at a second, and lower height, and having two layers of rigid insulation board below the wall portion 9 in the mobile home system 1, the anticipated insulation protection of the sub-floor of the floor portion 8, when combined with the thermal protection from the insulation riser 72, would be expected to yield a combined effective R-value of at least approximately R-18. This is far improved over traditional mobile home insulation properties, and would be expected to be approximately 4 times as effective at insulating the flooring as previously known commonly employed building methods. This improved thermal management can be attributed to the floor portion, as it includes an insulation board provided within 100% of the floor surface area, would be expected to have at least an insulation value of about R-7. Furthermore, over approximately 95-96% of the floor surface area, which will further include the insulation board riser 72, will have a combined insulation value approaching R-16 or even R-18, and vastly outperform traditional construction methods in isolating the interior of the home from heat loss or gain through the floor portion.

In an embodiment, it is further contemplated that additional insulation batting or foam boards could be provided, for example, added by the user after the trailer has been parked in a location for extended, static use as a shelter, with such additional insulation, for example R-15 batting, adding enhanced protection from severe temperatures, and potentially providing a combined effective R-value of R-24.

Additionally, the mobile home 5 as described herein can provide insulation within the wall portion 9, placed into the cavities between the studs 16. The exterior sheathing panels 20 as have been described previously, could incorporate a layer of insulation foam on the interior facing side of the exterior sheathing panels 20, as has been discussed. Additionally, as the exterior sheathing panel is not providing structural support, in contrast to traditional construction where the exterior sheathing does provide planar reinforcement to the wall framing, the exterior sheathing may be applied over additional layers of insulation board, and thereby can provide improved thermal management within the wall portion. Similarly, the roof portion 7 may be provided with insulation between the rafters to provide adequate thermal management in the roof portion 7. If deemed necessary, the rafters 32 in all or some of the roof portion 7 may be provided with greater height dimension, to allow the provision of additional insulation within the interior space, underneath the roof panels 38 and above the interior of the home.

In addition to enhanced insulation properties, the mobile home 5 could be designed to deal with severe cold by ensuring that plumbing and water lines are routed through interior wall portions only, avoiding being directed through exterior walls, and further insulating the lines to avoid freezing in the winter.

One skilled in the art will recognize that the teachings herein to provide examples, and the various components described herein may be provided in alternative configurations that fall within the spirit of the invention. For, example, it is contemplated that the foregoing illustrates some of the possibilities for practicing the invention. Many other embodiments are possible within the scope and spirit of the invention. The disclosed invention utilizes the above identified components, as a system, in order to more efficiently construct a mobile home system providing structure atop a platform trailer. Therefore, more or less of the aforementioned components can be used to conform to that particular purpose. It is, therefore intended that the foregoing description be regarded as illustrative rather than limiting, and that the scope of the invention is given by the appended claims together with their full range of equivalents.

What is claimed is:

1. A mobile home system, comprising:
a structure having: a floor portion;
a roof portion includes a ridge beam; and
a plurality of vertical walls positioned between the floor portion and the roof portion; and
a trailer coupled to the floor portion of the mobile home and having a chassis and a tongue, the chassis includes a pair of outer frame rails and a pair of inner frame rails that extend longitudinally along a length of the trailer; the chassis further includes a plurality of cross rails, the inner frame rails and the pair of outer frame rails form structural box members at the outermost sides of the trailer, a shield resides on top of the plurality of cross rails, an insulation riser resides on top of the shield, a gasket material resides atop the inner frame rails and the outer frame rails;

a vapor barrier membrane provided between the trailer and the structure, the vapor barrier membrane having planar dimension in length and width that exceed a length and width of the structure;
a bottom sheathing layer, the vapor barrier is adhered to an underside surface of the bottom sheathing layer;
a ribbing;
a foam insulation layer having a foam board, wherein the ribbing forms a perimeter around the foam board of the foam insulation layer; and
a top sheathing layer, the top sheathing layer is positioned at a first side of the foam insulation layer.

2. The mobile home system of claim 1, further includes the ribbing composed of wood.

3. The mobile home system of claim 1, wherein the roof portion further includes a plurality of rafters.

4. The mobile home system of claim 3, wherein one of the plurality of vertical walls includes a doorway opening.

5. The mobile home system of claim 4, wherein the plurality of vertical walls further includes at least one wall with a top plate.

6. The mobile home system of claim 5, wherein the plurality of vertical walls further includes at least one wall with a sill plate.

* * * * *